(12) United States Patent
Chakraborty et al.

(10) Patent No.: US 12,592,767 B2
(45) Date of Patent: Mar. 31, 2026

(54) METHODS AND DEVICE FOR PROVIDING SEAMLESS CONNECTIVITY IN A CALL

(71) Applicant: Samsung Electronics Co., Ltd., Suwon-si (KR)

(72) Inventors: Prasenjit Chakraborty, Bangalore (IN); Naveen Kolati, Bangalore (IN); Ravi Surana, Bangalore (IN); Siva Prasad Gundur, Bangalore (IN); Srinidhi N, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 307 days.

(21) Appl. No.: 18/505,848

(22) Filed: Nov. 9, 2023

(65) Prior Publication Data

US 2024/0267116 A1     Aug. 8, 2024

Related U.S. Application Data

(63) Continuation of application No. PCT/KR2023/016780, filed on Oct. 26, 2023.

(30) Foreign Application Priority Data

Feb. 7, 2023     (IN) .............................. 202341007714
Aug. 31, 2023     (IN) .............................. 2023 41007714

(51) Int. Cl.
*H04B 7/185*     (2006.01)
*G06T 13/20*     (2011.01)
(Continued)

(52) U.S. Cl.
CPC ....... *H04B 7/18513* (2013.01); *G06T 13/205* (2013.01); *G06T 13/40* (2013.01);
(Continued)

(58) Field of Classification Search
CPC ....... G06T 13/205; G06T 13/40; G10L 15/26; H04B 7/18513
See application file for complete search history.

(56) References Cited

U.S. PATENT DOCUMENTS 6,763,226 B1     7/2004     McZeal, Jr. et al.
7,321,383 B2     1/2008     Monagahn et al.
(Continued)

FOREIGN PATENT DOCUMENTS

CN     110781328 A     2/2020
CN     113286110 A     8/2021
(Continued)

OTHER PUBLICATIONS

International Search Report dated Jan. 25, 2024, issued in International Application No. PCT/KR2023/016780.
(Continued)

*Primary Examiner* — Zhensheng Zhang
(74) *Attorney, Agent, or Firm* — Jefferson IP Law, LLP

(57)     ABSTRACT

A method for providing, by an electronic device, seamless connectivity in a call is provided. The method comprises transmitting satellite communication capability information and converter capability information to one or more other electronic devices; receiving the satellite communication capability information and the converter capability information from the one or more other electronic devices; establishing a call with the one or more other electronic devices using a non-satellite communication network; and transferring the call from the non-satellite communication network to a satellite communication network using the satellite communication capability information and the converter capability information of the electronic device and of the one or more other electronic devices, based on determining
(Continued)

that state of the non-satellite communication network is not sufficient for continuing the call.

18 Claims, 31 Drawing Sheets

(51) Int. Cl.
| | | |
|---|---|---|
| *G06T 13/40* | (2011.01) | |
| *G10L 15/26* | (2006.01) | |
| *H04L 65/1108* | (2022.01) | |

(52) U.S. Cl.
CPC .......... *G10L 15/26* (2013.01); *H04B 7/18517* (2013.01); *H04L 65/1108* (2022.05)

(56) References Cited

U.S. PATENT DOCUMENTS

| | | | |
|---|---|---|---|
| 7,818,003 B2 | 10/2010 | Callaghan | |
| 9,264,659 B2 | 2/2016 | Abuan et al. | |
| 9,736,318 B2 | 8/2017 | Kaminsky et al. | |
| 10,700,769 B2 | 6/2020 | Wang et al. | |
| 11,246,019 B2 | 2/2022 | Khan et al. | |
| 2002/0072389 A1 | 6/2002 | Ward et al. | |
| 2005/0153732 A1* | 7/2005 | Stotelmyer | H04W 88/06 |
| | | | 455/552.1 |
| 2010/0124934 A1 | 5/2010 | Mach et al. | |
| 2016/0380693 A1* | 12/2016 | Scott | H04B 7/18571 |
| | | | 455/427 |

| | | | |
|---|---|---|---|
| 2017/0034355 A1* | 2/2017 | Kamat | H04M 3/53308 |
| 2020/0177647 A1* | 6/2020 | Ravichandran | H04N 7/152 |
| 2021/0241465 A1 | 8/2021 | Yamasaki et al. | |
| 2022/0030511 A1 | 1/2022 | Wang et al. | |
| 2022/0256631 A1 | 8/2022 | Jain et al. | |
| 2023/0156065 A1 | 5/2023 | Liu et al. | |
| 2024/0146398 A1 | 5/2024 | Breuer et al. | |
| 2024/0179272 A1 | 5/2024 | Wang et al. | |

FOREIGN PATENT DOCUMENTS

| | | |
|---|---|---|
| CN | 113838178 A | 12/2021 |
| CN | 113938468 A | 1/2022 |
| EP | 2 829 085 B1 | 3/2020 |
| EP | 4 113 929 A1 | 1/2023 |
| KR | 10-2368233 B1 | 3/2022 |

OTHER PUBLICATIONS

SpeakPic—Make your photos speak, 2023 https://indexcorner.com/app/speakpic-make-your-photos-speak/.

VSAT video call—enabling remote support for maritime, Mar. 6, 2020 https://pointr.com/2020/03/vsat-video-call-enabling-remote-support-for-maritime/.

Technology Provides Easy Switch Between Satellite, Cellular Communications, Feb. 27, 2015. https://www.mwrf.com/technologies/systems/article/21846102/technology-provides-easy-switch-between-satellite-cellular-communication.

* cited by examiner

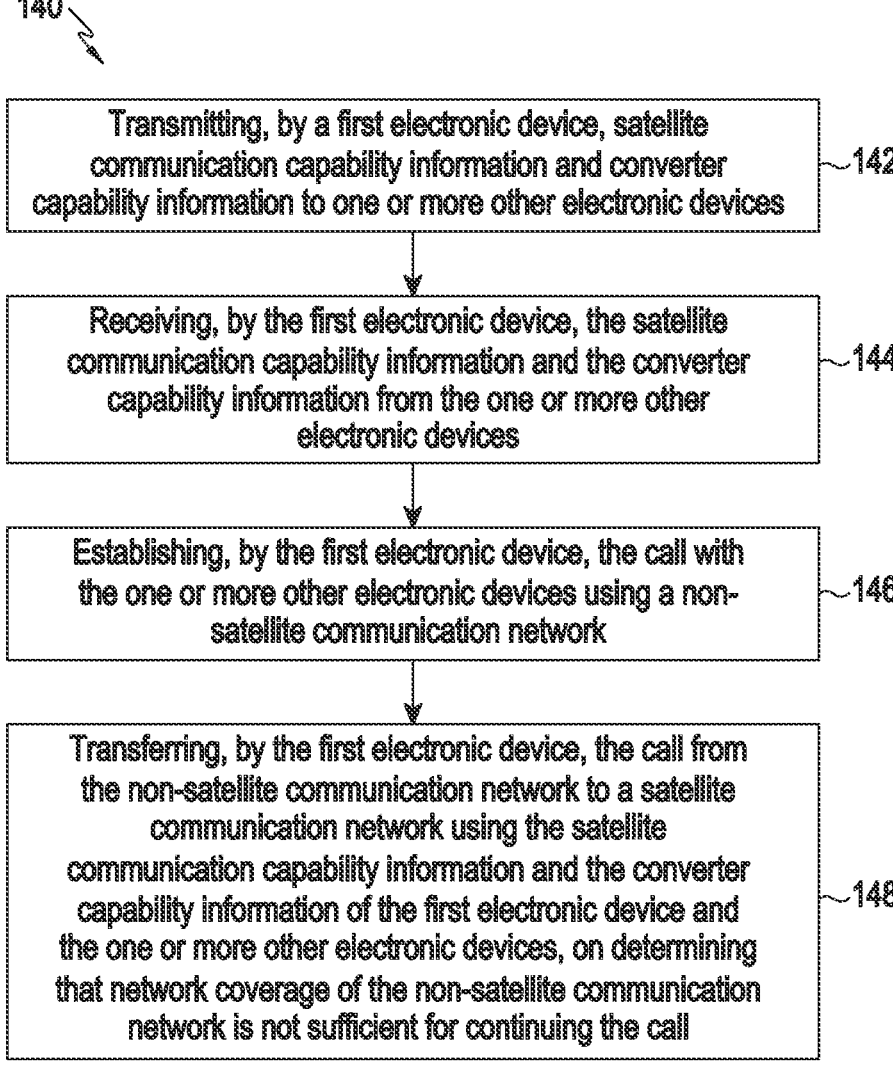

140

Transmitting, by a first electronic device, satellite communication capability information and converter capability information to one or more other electronic devices ~142

Receiving, by the first electronic device, the satellite communication capability information and the converter capability information from the one or more other electronic devices ~144

Establishing, by the first electronic device, the call with the one or more other electronic devices using a non-satellite communication network ~146

Transferring, by the first electronic device, the call from the non-satellite communication network to a satellite communication network using the satellite communication capability information and the converter capability information of the first electronic device and the one or more other electronic devices, on determining that network coverage of the non-satellite communication network is not sufficient for continuing the call ~148

METHODS AND DEVICE FOR PROVIDING SEAMLESS CONNECTIVITY IN A CALL

CROSS REFERENCE TO RELATED APPLICATION

This application is a continuation application, claiming priority under § 365(c), of an International application No. PCT/KR2023/016780, filed on Oct. 26, 2023, which is based on and claims the benefit of an Indian Provisional patent Application number 202341007714, filed on Feb. 7, 2023, in the Indian Intellectual Property Office, and of an Indian Non-Provisional patent Application number 202341007714, filed on Aug. 31, 2023, in the Indian Intellectual Property Office, the disclosure of each of which is incorporated by reference herein in its entirety.

TECHNICAL FIELD

The disclosure relates to the field of wireless communication. More particularly, the disclosure relates to methods and devices for providing seamless connectivity in a call between electronic devices under varying network conditions.

BACKGROUND

Video calling over wireless communication networks relies on a transmission of audio and video data packets between devices using the underlying wireless infrastructure. Video call using operator network is constrained in many ways unlike Over-the-top (OTT) call solutions, as the operator decides on the quality of media being sent as well as when to disable transmitting of which media depending on the network strength. For example, if a network is weak, the video channel gets disabled and only the audio gets transmitted. When the video calling is performed in weak, or poor network areas, Quality of Experience (QoE) is poor with choppy audio and/or video. Video call downgrades to audio call during prolonged bad network conditions reducing the immersive nature of the call. When moving to a no network area, video or audio calls are dropped off without any provision for continuity. Additionally, due to cost and latency, high data transmission requirement for video calling makes it impossible to execute during satellite communication.

The above information is presented as background information only to assist with an understanding of the disclosure. No determination has been made, and no assertion is made, as to whether any of the above might be applicable as prior art with regard to the disclosure.

OBJECTS

Aspects of the disclosure are to address at least the above-mentioned problems and/or disadvantages and to provide at least the advantages described below. Accordingly, an aspect of the disclosure is to provide methods and systems for providing seamless connectivity in a call between electronic devices under varying network conditions.

Additional aspects will be set forth in part in the description which follows and, in part, will be apparent from the description, or may be learned by practice of the presented embodiments.

SUMMARY

In accordance with an aspect of the disclosure, a method for providing, by an electronic device, seamless connectivity in a call is provided. An electronic device transmits satellite communication capability information and converter capability information to one or more other electronic devices. The electronic device receives the satellite communication capability information and the converter capability information from the one or more other electronic devices. The electronic device establishes the call with the one or more other electronic devices using a non-satellite communication network. The electronic device transfers the call from the non-satellite communication network to a satellite communication network using the satellite communication capability information and the converter capability information of the electronic device and the one or more other electronic devices, based on determining that state of the non-satellite communication network is not sufficient for continuing the call.

In accordance with an aspect of the disclosure, an electronic device for providing seamless connectivity in a call is provided. The electronic device includes a memory and a processor coupled to the memory. The processor is configured to transmit satellite communication capability information and converter capability information to one or more other electronic devices. The processor is configured to receive the satellite communication capability information and the converter capability information from the one or more other electronic devices. The processor is configured to establish the call with the one or more other electronic devices using a non-satellite communication network. The processor is configured to transfer the call from the non-satellite communication network to a satellite communication network using the satellite communication capability information and the converter capability information of the electronic device and the one or more other electronic devices, based on determining that state of the non-satellite communication network is not sufficient for continuing the call.

In accordance with an aspect of the disclosure a non-transitory computer readable storage medium storing instructions is provided. The instructions, when executed by a processor of an electronic device, cause the electronic device to perform operations. The operations comprise transmitting satellite communication capability information and converter capability information to one or more other electronic devices; receiving the satellite communication capability information and the converter capability information from the one or more other electronic devices; establishing the call with the one or more other electronic devices using a non-satellite communication network; and transferring the call from the non-satellite communication network to a satellite communication network using the satellite communication capability information and the converter capability information of the electronic device and of the one or more other electronic devices, based on determining that state of the non-satellite communication network is not sufficient for continuing the call Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF FIGURES

The above and other aspects, features, and advantages of certain embodiments of the disclosure will be more apparent from the following description taken in conjunction with the accompanying drawings, in which:

FIG. 1E illustrates method for providing seamless connectivity in a call between electronic devices under varying network conditions, according to an embodiment of the disclosure;

Throughout the drawings, it should be noted that like reference numbers are used to depict the same or similar elements, features, and structures.

DETAILED DESCRIPTION

Figure 1A:
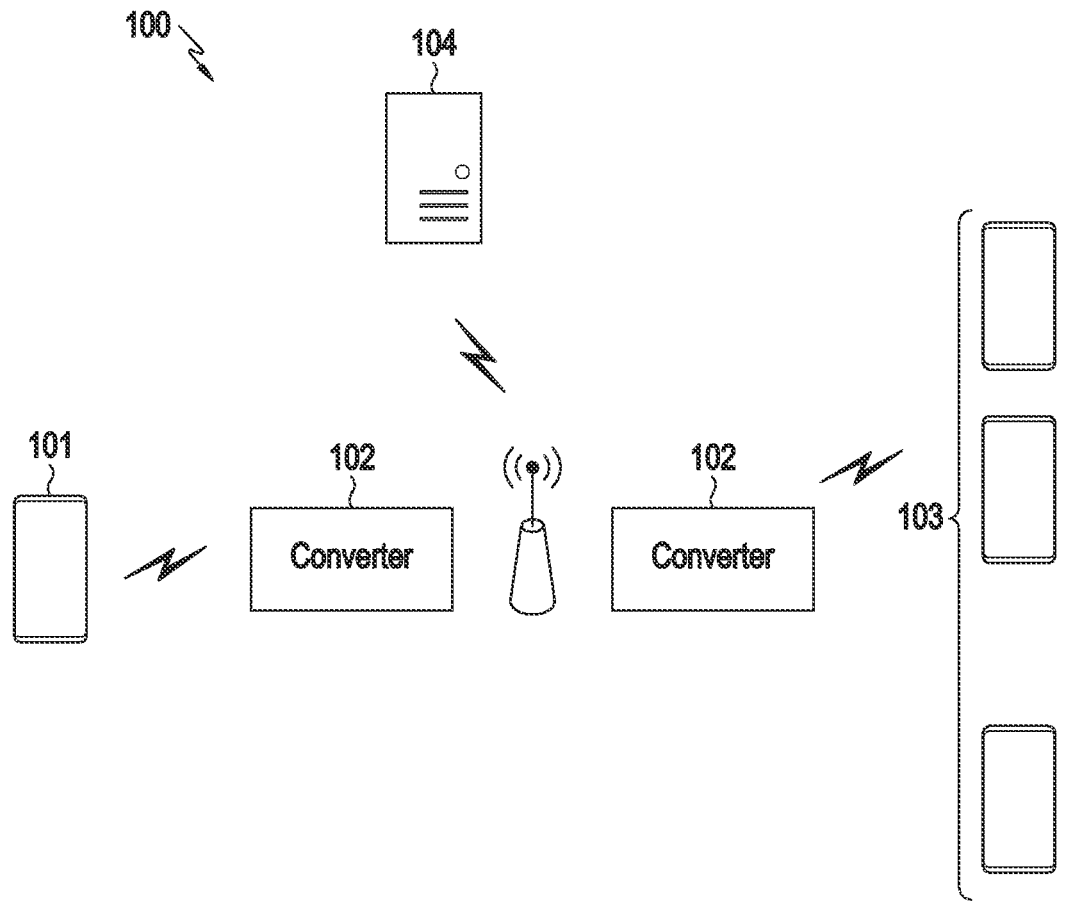
FIG. 1A illustrates a communication system for providing seamless connectivity in a call between electronic devices under varying network conditions, according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The embodiments herein achieve techniques for providing seamless connectivity in a call between electronic devices under varying network conditions. The embodiments herein enable improved user experience during a video call through effective reconstruction techniques which eliminates transfer of bulky data as well as enabling handover to satellite connection if operator network has been completely lost. Referring now to the drawings, and more particularly to FIGS. 1A to 1K, 2 to 17, 18A to 18C, 19A, and 19B, where similar reference characters denote corresponding features consistently throughout the figures, there are shown example embodiments.

FIG. 1A illustrates a communication system 100 for providing seamless connectivity in a call between electronic devices under varying network conditions, according to an embodiment of the disclosure.

The communication system 100 can be, but not limited to, a fifth generation (5G) based network. In embodiments herein, the communication system 100 enables wireless communication between the various components in the system directly or indirectly, for example, but not limited to, through one or more next generation node Bs (gNBs), next generation evolved node B (ng-eNB), 5G core (5GC), and the like. The system 100 comprises a first electronic device 101 communicatively coupled to a converter 102. In an embodiment, the first electronic device 101 is configured to communicate with one or more other electronic devices 103 using a communication channel. In another embodiment, the first electronic device 101 and the one or more other electronic devices 103 can be, for example, but not limited to, smartphones, tablets, Personal Digital Assistants (PDAs), laptops, Internet of Things (IoT) devices, wearable devices, vehicle-based devices, and any other device capable of communicating through the communication network. The communication channel may be either a non-satellite network, such as, but not limited to, an operator network, or a satellite network. Each of the one or more other electronic devices 103 can be communicatively coupled to the converter 102. In yet another embodiment, the first electronic 101 device and the other electronic devices 103 may be communicatively coupled to an operator server 104.

Both the first electronic device 101 and the other electronic devices 103 comprise a transmitter and a receiver. The converter module is preferred to be available in all the participating devices, i.e., both the first and other electronic devices. Embodiments herein have been explained by considering the transmitter at the first electronic device and the receiver at the other electronic devices. Hereinafter "transmitter" will refer to the first electronic device and the "receiver" will refer to the other electronic devices. It should be noted that, both the first electronic device and the other electronic devices will inter-changeably act as both transmitter (when it is sending local feed) and receiver (when it is receiving the remote feed). All components and subcomponents, including the "converter module", will be present in both the devices.

The terms "converter", "converter module", intelligent converter" have been used interchangeably hereinafter. According to various embodiments, the converter 102 is further divided into a transmitter (Tx) block and a receiver (Rx) block. According to other embodiments, the converter is preferred to be available in all participating devices but is to be mandatorily present on the receiver side. Still other embodiments disclose a method to continue on a seamless video call communication even when there are continuous or intermittent changes in network conditions in at least one participating device (as depicted in FIG. 1A). The method includes negotiating between both devices (Tx and Rx) for "Satellite Communication" and "Intelligent Converter" capability over Session Initiation Protocol/Session Description Protocol (SIP/SDP) and Real-time transport Control Protocol (RTCP). Embodiments herein disclose the participating devices determining about the network conditions and signal strength continuously.

Figure 1B:
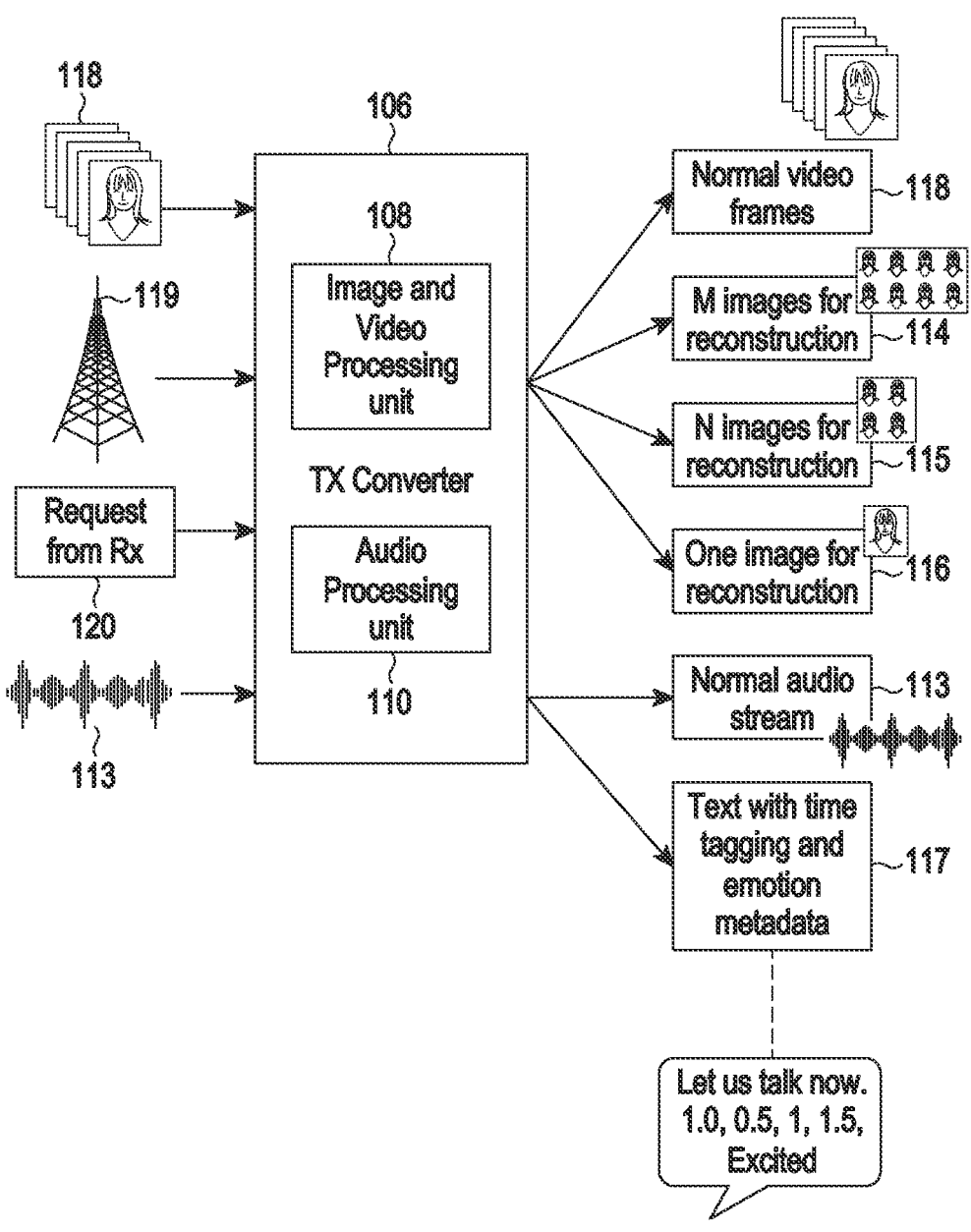
FIG. 1B illustrates a transmitter (Tx) converter, according to an embodiment of the disclosure.

FIG. 1B illustrates a transmitter (Tx) converter 106, according to an embodiment of the disclosure.

The Tx converter 106 is configured to send videos or images, and audio or text, along with additional metadata, for example, emotion tags, depending on the scenario. In another embodiment, the Tx converter 106 comprises an image and video processing unit 108 and an audio processing unit 110. The image and video processing unit 108 performs, for example, image extraction with different emotions and head poses and further performs emotion detection. In case of a good network, the Tx converter 106 is configured to send an entire video 112 and audio 113. In case of a weak, poor, or no network (i.e., in case of lower bandwidth), the Tx converter 106 is configured to transmit limited number of important video frames 114, 115, 116 as well as time-tagged text messages with metadata and associated time 117, using a speech-to-text module for converting the audio to text data. The audio processing unit 110 performs, for example, speech-to-text conversion, emotion detection, voice modulation detection, and so on. The inputs to the Tx converter 106 comprise camera data 118, network parameters 119, requests from the receiver 120, and the audio data 121.

Figure 1C:
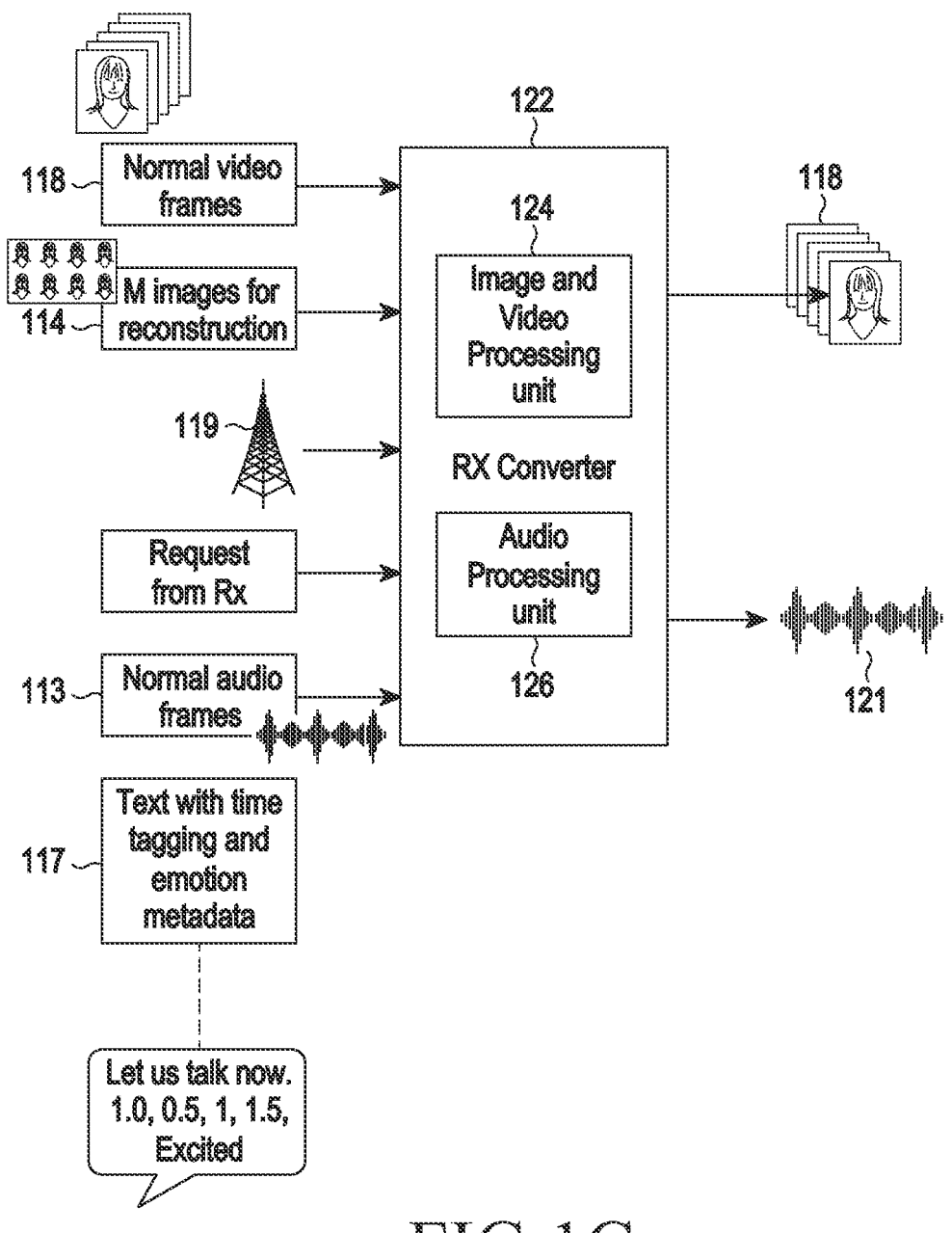
FIG. 1C illustrates a receiver (Rx) converter, according to an embodiment of the disclosure.

FIG. 1C illustrates a receiver (Rx) converter 122, according to an embodiment of the disclosure.

The Rx converter 122 comprises an image and video processing unit 124 and an audio processing unit 126. In another embodiment, the Rx converter is configured to receive inputs, such as, but not limited to, videos (i.e., camera data 118), images, audio 113, time-tagged text messages with metadata and associated time 117, content type, emotion tags as well as voice modulation settings for mimicking the Tx user voice characteristics and to generate the animated audio-video synchronized content for rendering. In yet another embodiment, the Rx converter 122 may be configured to request additional image feed 1 from the transmitter. The request is typically sent when the Rx converter 122 does not have sufficient images, or video frames to generate the required video.

Figure 1D:
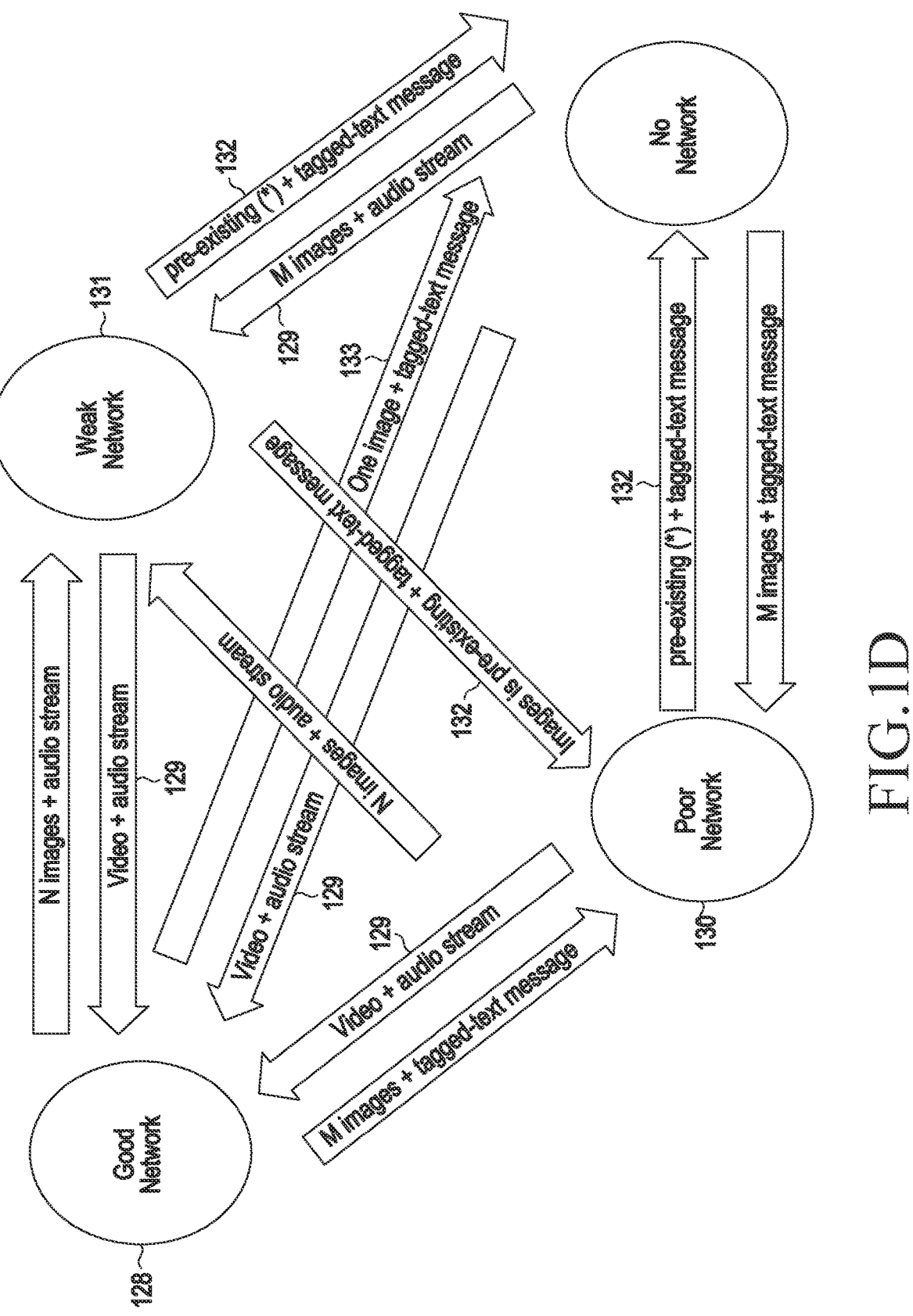
FIG. 1D illustrates a state transition diagram, according to an embodiment of the disclosure.

FIG. 1D illustrates a state transition diagram, according to an embodiment of the disclosure.

The state refers to a network state. For example, the network state is one of good, poor, weak, and no network. The network state is determined based on signal strength, network parameters and other ambient conditions at the transmitter. In an example, when the network is strong 128, at block 129, normal audio and video flow continues and gets transmitted by the transmitter and received by the receiver for video calling rendering. In another example, when the network changes and moves towards a weaker connection (i.e., poor 130, or weak 131), the receiver converter first checks if there are enough number of frames for creating video and lip-sync animation. In case of image content not being available, the receiver requests image feed from the transmitter for lip-sync animation. In case of image content being already available, based on the previously received videos or frames, at block 132, the receiver does not request new video or image feed from the transmitter. In an embodiment, the transmitter converter continues to send the audio feed for the receiver converter to generate the synchronized video feed using image content. When the network degrades further, the transmitter converter starts transmitting time-tagged text messages. When the receiver converter receives the transmitted time-tagged text messages, the transmitted time-tagged text messages get converted modulated audio and further used to generate the synchronized video feed.

In an example, when the state of the non-satellite communication network changes from good or weak or no network to poor, the poor network referring to a bandwidth lesser than that of the weak network, the other electronic devices query the converter, if the other electronic devices comprise a pre-determined number of images to recreate user expression and poses based on audio content. The pre-determined number of images indicates the number of images sufficient for video reconstruction. FIGS. 1G to 1K illustrate example techniques for video reconstruction using a single frame/limited number of frames, according to various embodiments of the disclosure. The other electronic devices send request to the first electronic device to transmit M number of images required for video reconstruction and time-tagged text messages with metadata based on the audio content, on determining there are no pre-determined number of images available at the one or more other electronic devices. The request for the M number of images is sent using a Real-time Transport Control Protocol (RTCP) Secure Data Encryption Standard (SDES) message. In the embodiments, alternative mechanisms, such as RTCP App, or Session Initiation Protocol/Session Description Protocol (SIP/SDP) based communication can also be done for exchanging images and other requests. The first electronic device receives the request for the M number of images from the other electronic devices. In an embodiment, the first electronic device transmits the M number of images and the time-tagged text messages with metadata to the other electronic devices. The other electronic devices regenerate video and audio using the received M number of images and the time-tagged text messages with metadata. In another embodiment, the first electronic device transmits the time-tagged text messages with metadata, on determining that there are pre-determined number of images available at the one or more other electronic devices by the converter.

When the state of the non-satellite communication network changes from good or poor or no network to weak, the first electronic device transmits a signal to the other electronic devices indicating the change in the non-satellite communication network. In an embodiment, the other electronic devices query a receiver converter communicatively coupled to the other electronic devices, if the other electronic devices comprise a pre-determined number of images to recreate user expression and poses based on audio content. The pre-determined number of images indicates the number of images sufficient for video reconstruction. FIGS. 1G to 1K illustrate example techniques for video reconstruction using a single frame/limited number of frames, according to various embodiments of the disclosure. The other electronic devices send request to the first electronic device to transmit N number of images required for video reconstruction on determining that there are no pre-determined number of images available at the other electronic devices, N being an integer greater than M. The request for the N number of images is sent using an RTCP SDES message. According to the embodiments herein, alternative mechanisms, such as RTCP App, or Session Initiation Protocol/Session Description Protocol (SIP/SDP) based communication can also be done for exchanging images and other requests. The first electronic device receives the request for the N images from the other electronic devices. The images correspond to video frames. In an embodiment, the first electronic device transmits the N number of images and metadata-time tagged text messages corresponding to audio content to the other electronic devices. The other electronic devices regenerate video and audio using the received N number of images and the metadata-time tagged text messages based on the audio content from the first electronic device. In another embodiment, the first electronic device transmits audio packets over an audio RTP port, on determining that there are pre-determined number of images are available at the one or more other electronic devices.

When the network degrades even further, the operator call settings on the transmitter get saved and the operator call gets disconnected. In parallel, a new silent dialing gets triggered at the transmitter with the previously received satellite identifier. Depending on the need of the receiver converter, at operation 133, the transmitter converter sends the single image and continuously sends the time-tagged text messages with metadata. Upon receiving the time-tagged text messages with metadata, the receiver converter, for example, uses them to create the video call rendering from the image and the time-tagged text messages with metadata. Optionally, the transmitter converter may also send additional metadata and timing information via text messages to help the receiver converter to help generate better video call experience. The additional metadata and timing information includes receiving input of user emotion, based on front camera view as well as microphone data, as well as voice texture based on the microphone data.

When the state of the non-satellite communication network changes from good or poor or weak to no network, the system is configured to transfer the call from the non-satellite communication network to a satellite communication network. In an embodiment, the converter generates a single image and converts audio content into time-tagged text messages with metadata. The first electronic device transmits the single image and the time-tagged text messages with metadata over either a data channel, or web real-time communication (WebRTC). In another embodiment, the converter at the receiver regenerate the video and audio based on the received single image and the time-tagged text messages with metadata.

When the state of the non-satellite communication network changes from no network to good, the first electronic device sends a SIP invite with audio content and video content and the satellite communication capability information to establish a session. The other electronic devices acknowledge that the session is established. The first electronic device terminates satellite call and starts communication over the non-satellite communication network. In another embodiment, the first electronic device transmits a plurality of video frames over a video Real-time Transport Protocol (RTP) port and a plurality of audio packets over the audio RTP.

When the state of the non-satellite communication network changes from weak or poor to good, the audio call is upgraded to a video call.

FIG. 1E illustrates method 140 for providing seamless connectivity in a call between electronic devices under varying network conditions, according to an embodiment of the disclosure.

At operation 142, the first electronic device 101 transmits satellite communication capability information and converter capability information to the other electronic devices 103. At operation 144, the first electronic device 101 receives, for example, satellite communication capability information and the converter capability information from the other electronic devices 103. At operation 146, the first electronic device 101 establishes the call with the other electronic devices 103 using the non-satellite communication network. At operation 148, the first electronic device 101 transfers, for example, the call from the non-satellite communication network to a satellite communication network using the satellite communication capability information and the converter capability information of the first electronic device 101 and the other electronic devices 103, on determining that network coverage of the non-satellite communication network is not sufficient for continuing the call.

Transmission of the satellite communication capability information and the converter capability information is based on negotiation performed during an initiation of the call through the non-satellite communication network using a communication protocol. In an embodiment, the system determines that the network coverage of the non-satellite communication network is not sufficient for continuing the call is one of good, weak, poor, and no network, is based on signal strength, network parameters, and ambient conditions at the first electronic device.

The various actions in method 140 may be performed in the order presented, in a different order or simultaneously. In some embodiments, some actions listed in FIG. 1E may be omitted.

Figure 1F:
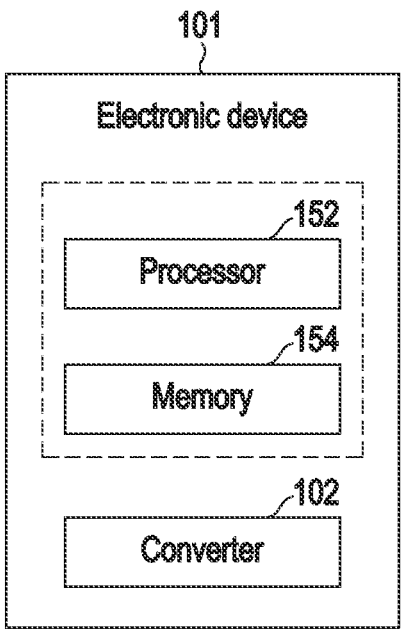
FIG. 1F illustrates a block diagram of an electronic device for providing seamless connectivity in a call under varying network conditions according to an embodiment of the disclosure.

FIG. 1F illustrates a block diagram of an electronic device for providing seamless connectivity in a call under varying network conditions according to an embodiment of the disclosure.

The electronic device 101 comprises a processor 152 coupled to a memory 154. The processor 152 is configured to execute instructions stored in the memory 154 and to perform various processes of the electronic device 101 described herein. The memory 154 may include non-volatile storage elements. Examples of such non-volatile storage elements may include magnetic hard discs, optical discs, floppy discs, flash memories, or forms of electrically programmable memories, EPROM, or electrically erasable and programmable, EEPROM, memories. In addition, the memory 154 may, in some examples, be considered a non-transitory storage medium. The term "non-transitory" may indicate that the storage medium is not embodied in a carrier wave or a propagated signal. However, the term "non-transitory" should not be interpreted that the memory 130 is non-movable. In certain examples, a non-transitory storage medium may store data that can, over time, change, e.g., in Random Access Memory, "RAM" or cache. In another embodiment, the electronic device 101 is to be communicatively coupled to one or more other electronic devices 103. In still another embodiment, the electronic device 101 and the one or more other electronic devices are communicatively coupled to a converter 102. The converter 102 comprises a transmitter converter 106 and a receiver converter 122. The electronic device 101 transmits satellite communication capability information and converter capability information to one or more other electronic devices 103. The one or more other electronic devices 103 are communicatively coupled to the converter. In yet another embodiment, the electronic device 101 receives satellite communication capability information and the converter capability information from the one or more other electronic devices. The electronic device 101 establishes the call with the one or more other electronic devices 103 using a non-satellite communication network. The electronic device 101 transfers, for example, the call from the non-satellite communication network to a satellite communication network using the satellite communication capability information and the converter capability information of the electronic device and the one or more other electronic devices 103, on determining that network coverage of the non-satellite communication network is not sufficient for continuing the call.

FIGS. 1G, 1H, 1I, 1J, and 1K illustrate example techniques for video reconstruction using a single frame/limited number of frames, according to various embodiments of the disclosure. When the number of frames are limited during transmission, or if only a single frame is transmitted, due to weak/poor/no network, a new video sequence may be created from an existing set of video frames or images using video reconstruction.

Figure 1G:
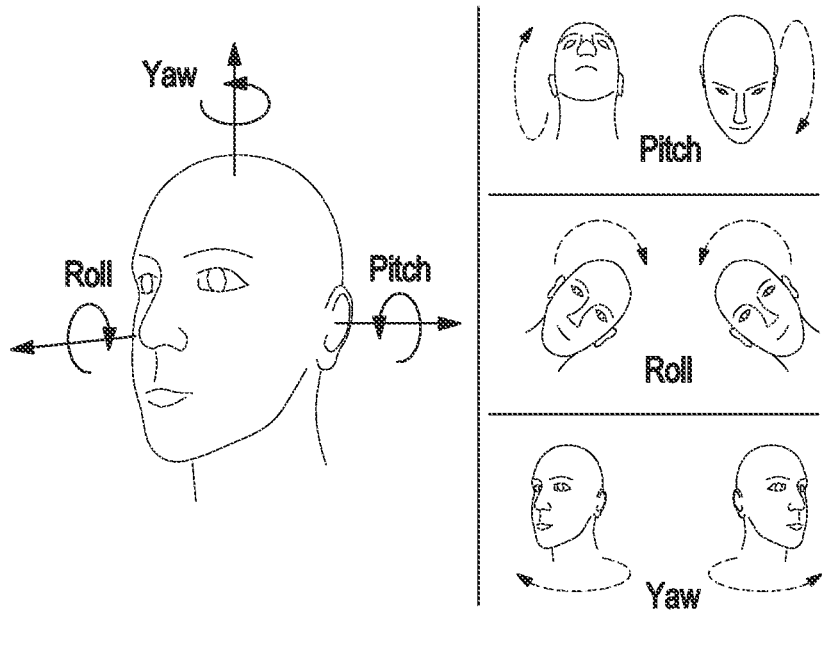
FIGS. 1G, 1H, 1I, 1J, and 1K illustrate example techniques for video reconstruction using a single frame/limited number of frames, according to various embodiments of the disclosure.
Figure 1G:
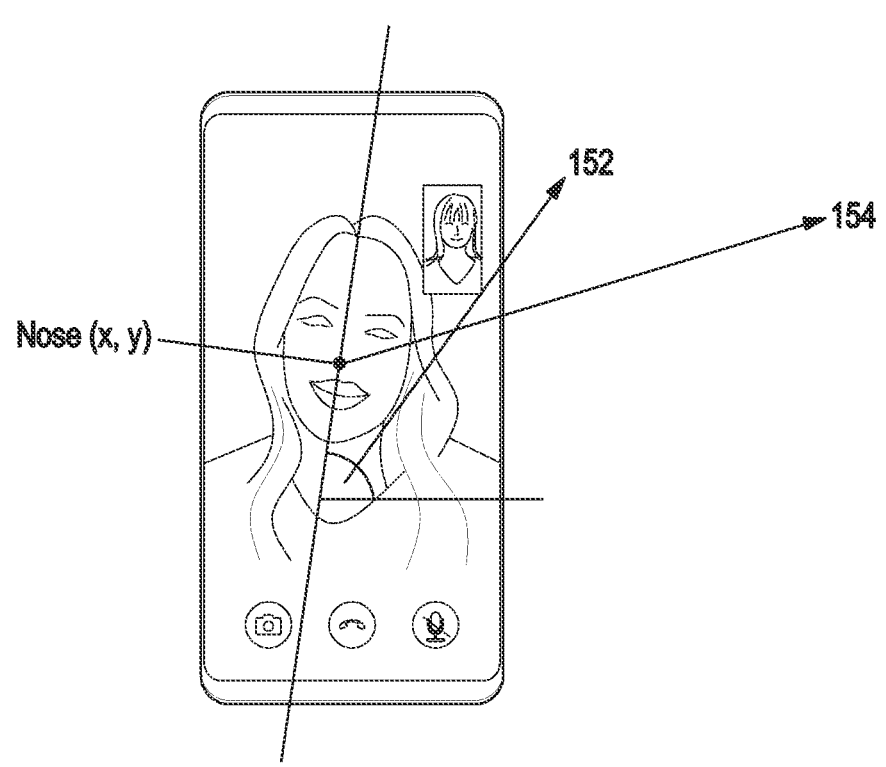
Figure 1H:
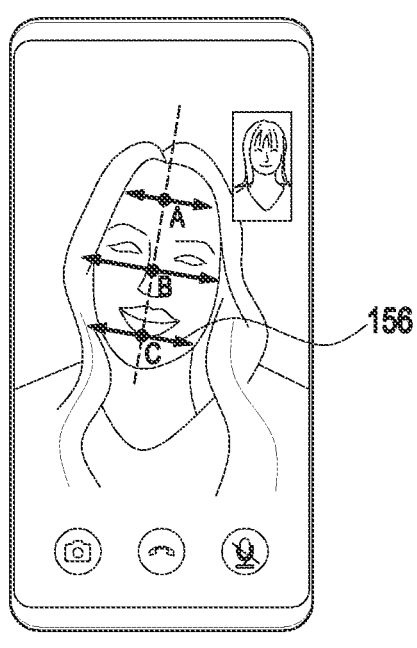
Figure 1H:
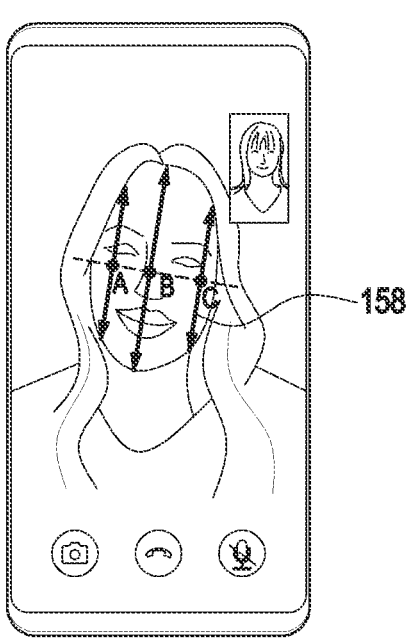
Figure 1I:
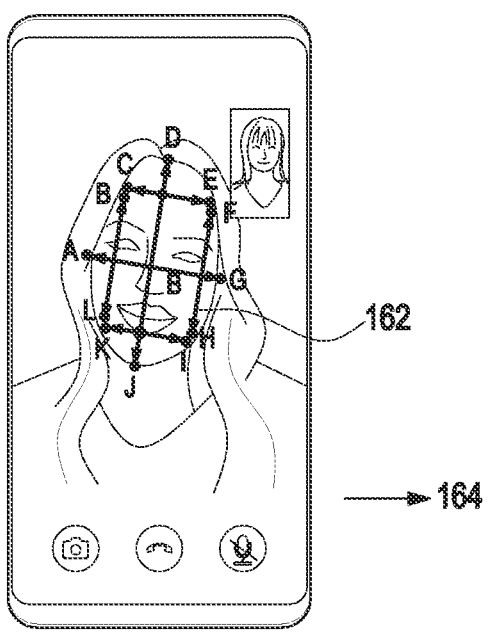
Figure 1I:
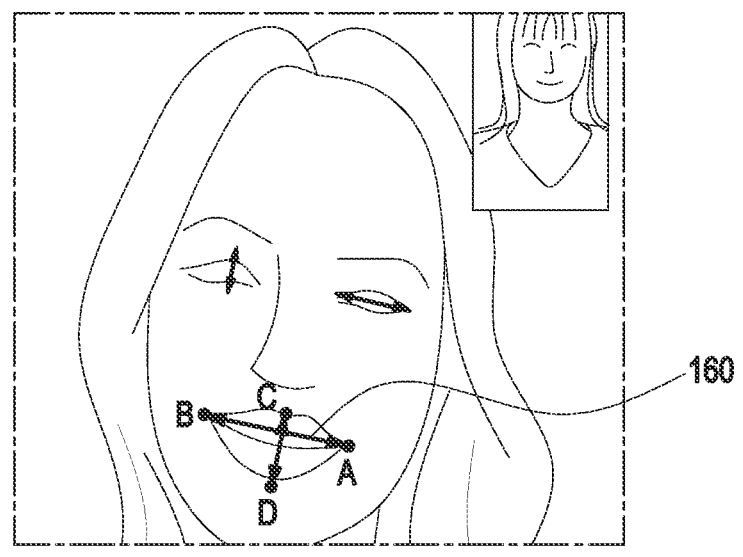

Orientation and motion of objects in three-dimensional space can be described using yaw, pitch, and roll. As shown in FIG. 1G, yaw is rotation around the vertical axis (heading or left/right motion), pitch is rotation around the horizontal axis (attitude or up/down motion), and roll is rotation around the longitudinal axis (bank or tilting side to side). In an example herein, the new video sequence may be created using parameters, such as an angle of face tilt with respect to the electronic device 152, co-ordinates of the nose 154, as shown in FIG. 1G, face's width at different heights 156 like A, B, C and face's length at different points 158 like A, B and C, as shown in FIG. 1H, eyes' and mouth's width and length 160, as shown in FIG. 1I. Using the angle of face tilt with respect to the electronic device 152 and the co-ordinates of the nose 154, location of the head in the video frame can be determined. As the head can be anywhere in the frame, for example, the head may be sideways such that only half of the face is visible, or the head may be at the bottom such that only the eyes and forehead are visible.

In an embodiment, as a line's slope and a point passing through the line uniquely identifies the line, the parameters, such as the angle of face tilt with respect to the electronic device 152 and the co-ordinates of the nose 154, uniquely identify the location of the head. According to the embodiments herein, reference points are not limited to nose. Other suitable reference points are possible.

The face's width at different heights like A, B, C, as shown in FIG. 1H can change based on how far the face is from the camera. The face boundary 162 may be determined by using the heights at different widths and face's length at different points, as shown in FIG. 1I. For example, 13 points (x, y), i.e., 26 parameters are sufficient to determine the face's shape. As shown in FIG. 1I, using the above six parameters, 26 parameters can be obtained. Using the captured head tilt angle and nose's co-ordinates, the four co-ordinates of mouth, i.e., A, B, C and D 164 may be obtained from the current mouth's length and width. The angle of the head rotation may be identified based on the direction of the eyes. The above two axes of rotation are possible for head and the third can be computed using the head tilt parameter. There are two ways for calculating the two axes of rotation. A formula that identifies these two rotation angles are determined based on where eyes are looking. An AI model can then be trained to identify these angles.

Figure 1J:
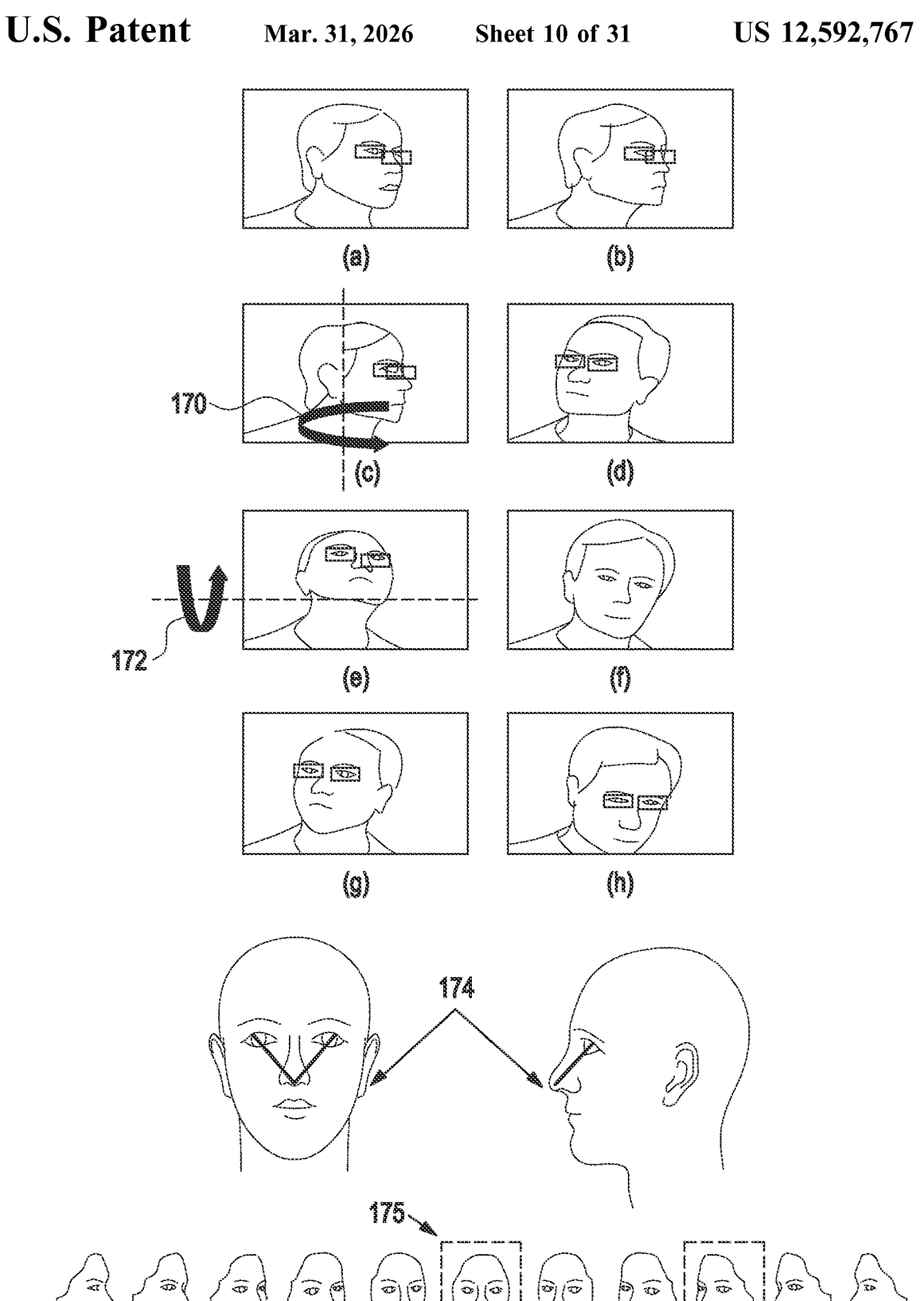

Consider the angle between eyes and nose in front profile as 'α' 174. In the true side profile, α will be zero, as shown in FIG. 1J, as both the lines will coincide. The more the yaw angle 170, the lesser the β, as shown in FIG. 1J. As shown in FIG. 1J (175), β increases from left to middle and it is maximum in the middle and then the value starts decreasing. The following relation can be used to compute the yaw angle (θ):

$$\text{Current-angle}(\beta) = \text{Front-view-angle}(\alpha) -$$

$$k * \text{yaw-angle}(\theta), \text{ where } k \text{ is the proportionality constant.}$$

$\beta = \alpha - k * \theta$, $\beta$ is 0 when $\theta = \pi/2(90°)$, therefore, $$0 = \alpha - k * \pi/2 \text{ or } k = 2\alpha/\pi.$$

$$\beta = \alpha \left(1 - \frac{2\Theta}{\pi}\right)$$

$$\text{Therefore, } \theta = \frac{\pi}{2}\left(1 - \frac{\beta}{\alpha}\right)$$

Using the above equation, the angle by which head is rotated may be computed. The direction of rotation, i.e., clockwise or anti-clockwise, will be based on which eye is near face boundary. The calculation of the yaw angle is not restricted to the above equation as other functions can also be used to calculate the yaw angle. According to the embodiments herein, yaw angle may be calculated using other methods, such as, but not limited to, 3D face models, gaze estimation, machine learning, and so on.

Figure 1K:
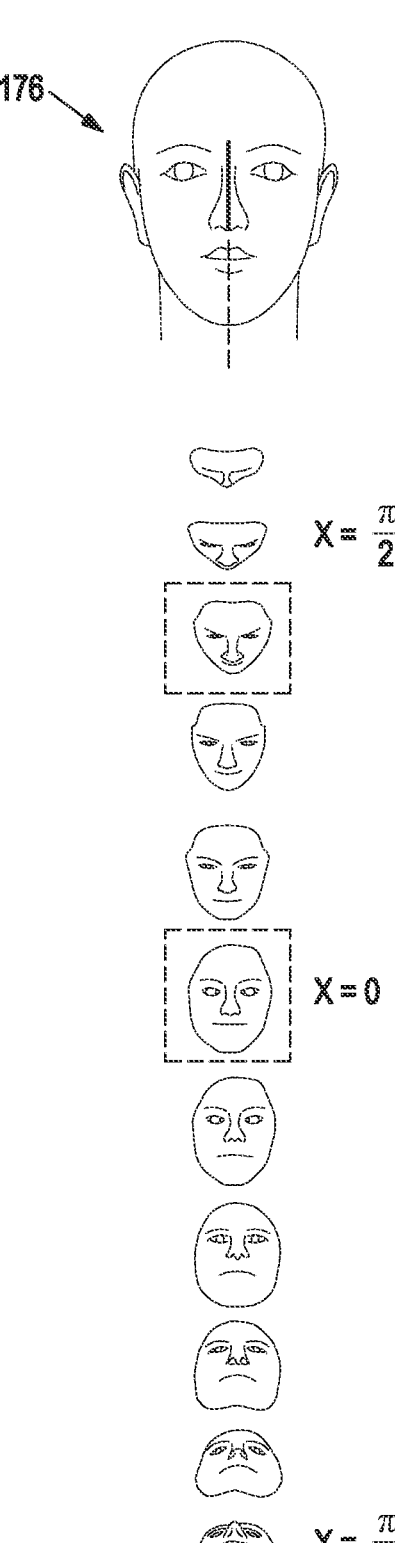

Consider that the ratio of length of line from tip of the nose to chin to the length of nose as m 176. As shown in FIG. 1K, m goes from 0 to ∞. Angle of pitch 172 (shown in FIG. 1J) can be obtained using m 176. This ratio may be used regardless of how far the face is from the camera. To map this value from 0 to 1, the relation m/(m+1) can be used, or it can be assumed that the pitch angle is $\tan^{-1}$ (some value). It may be approximated as, $$k * \tan\left(\frac{x}{2} + \frac{\pi}{4}\right) = m,$$

where x is the pitch angle ranging from $$-\frac{\pi}{2} \text{ to } +\frac{\pi}{2},$$

and k is a proportionality constant. According to other embodiments herein, other suitable approximation functions can also be used for the calculation of the pitch angle.

Figure 2:
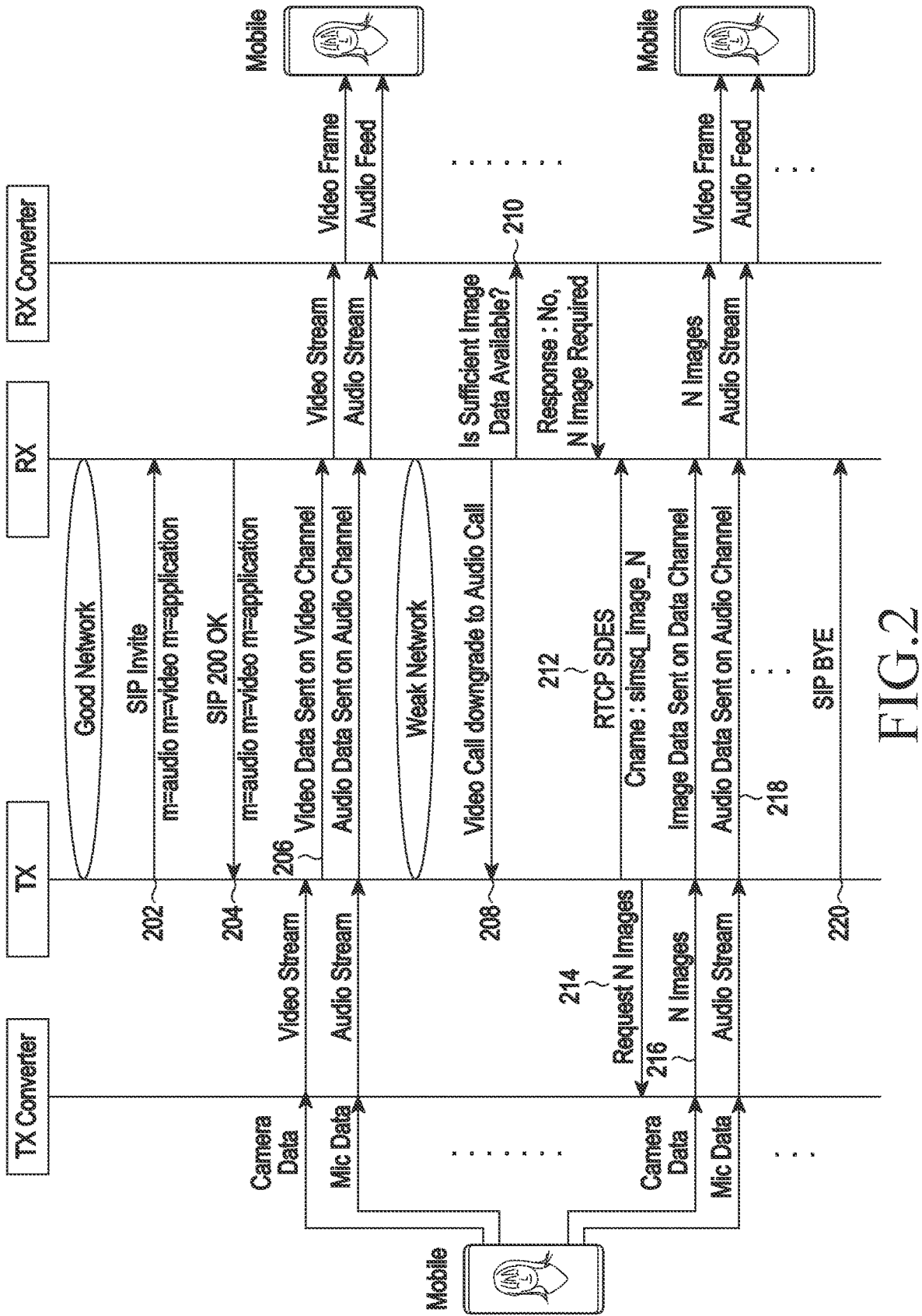
FIG. 2 illustrates a sample flow and details for negotiation and message exchange in case of an electronic device moving from good network to a weak network, according to an embodiment of the disclosure.

FIG. 2 illustrates a sample flow and details for negotiation and message exchange in case of an electronic device moving from good network to a weak network, according to an embodiment of the disclosure.

At operation 202, the transmitter of the electronic device sends a Session Initiation Protocol (SIP) invite to the receiver of the one or more other electronic devices with Audio [m=audio], Video [m=video], and Data Channel/WebRTC [m=application] support information. At operation 204, when the transmitter receives SIP 200 ok from the receiver with the Audio, Video, and Data Channel/WebRTC [m=application] support information, at operation 206, the transmitter sends video stream on video channel and audio stream on audio, to the receiver. When the network is good, the first electronic device and the other electronic devices establish a connection with the 5G network and negotiate the available bandwidth for the video call. In an embodiment, the network allocates resources based on the requested quality of Service (QoS) parameters and network conditions.

The first electronic device captures the video frames from its camera and encodes the video frames into a compressed format. Simultaneously, the first electronic device captures audio from its microphone and encodes the audio into a compressed audio format. In another embodiment, the encoded audio is synchronized with the video frames. The encoded video and audio data are divided into smaller packets and are transmitted over the 5G network using the assigned radio resources. In yet another embodiment, the receiver of the other electronic devices decodes the received video and audio packets, and the decoded video frames are rendered on the other electronic devices' display and the decoded audio is played through the other electronic devices' speaker or headphones.

At operation 208, when the call gets downgraded to an audio call, due to weak network, the receiver of the other electronic devices queries the converter to find out if the receiver has enough image data to recreate user expressions and poses based on the audio data. At operation 210, if the receiver returns a No, i.e., if there are not enough images for recreation, then the receiver sends, for example, a request to the transmitter of the first electronic device to send N images. At operation 212, the receiver of the other electronic devices uses an RTCP SDES message for conveying the request for the N images to the transmitter of the first electronic device. According to the embodiments herein, alternative mechanisms, such as RTCP App, or Session Initiation Protocol/Session Description Protocol (SIP/SDP) based communication can also be done for exchanging images and other requests. At operation 214, the transmitter of the first electronic device sends, for example, the request for the N images to the converter at the transmitter of the first electronic device to generate N images. At operation 216, the converter at the transmitter of the first electronic device generates the N images and sends the N images over a Data Channel or WebRTC to the receiver of the other electronic devices. At operation 218, the converter at the transmitter of the first electronic device sends, for example, audio stream to the receiver of the other electronic devices by way of audio packets over Audio RTP port. At operation 220, the first electronic device ends call with the other electronic devices by sending a SIP bye message. At operation 210, if the receiver returns a yes, i.e., if there are enough images for recreation, then at operation 211, the RTCP SDES message is not sent to the transmitter at the first electronic device and operation 218 will be executed.

Figure 3:
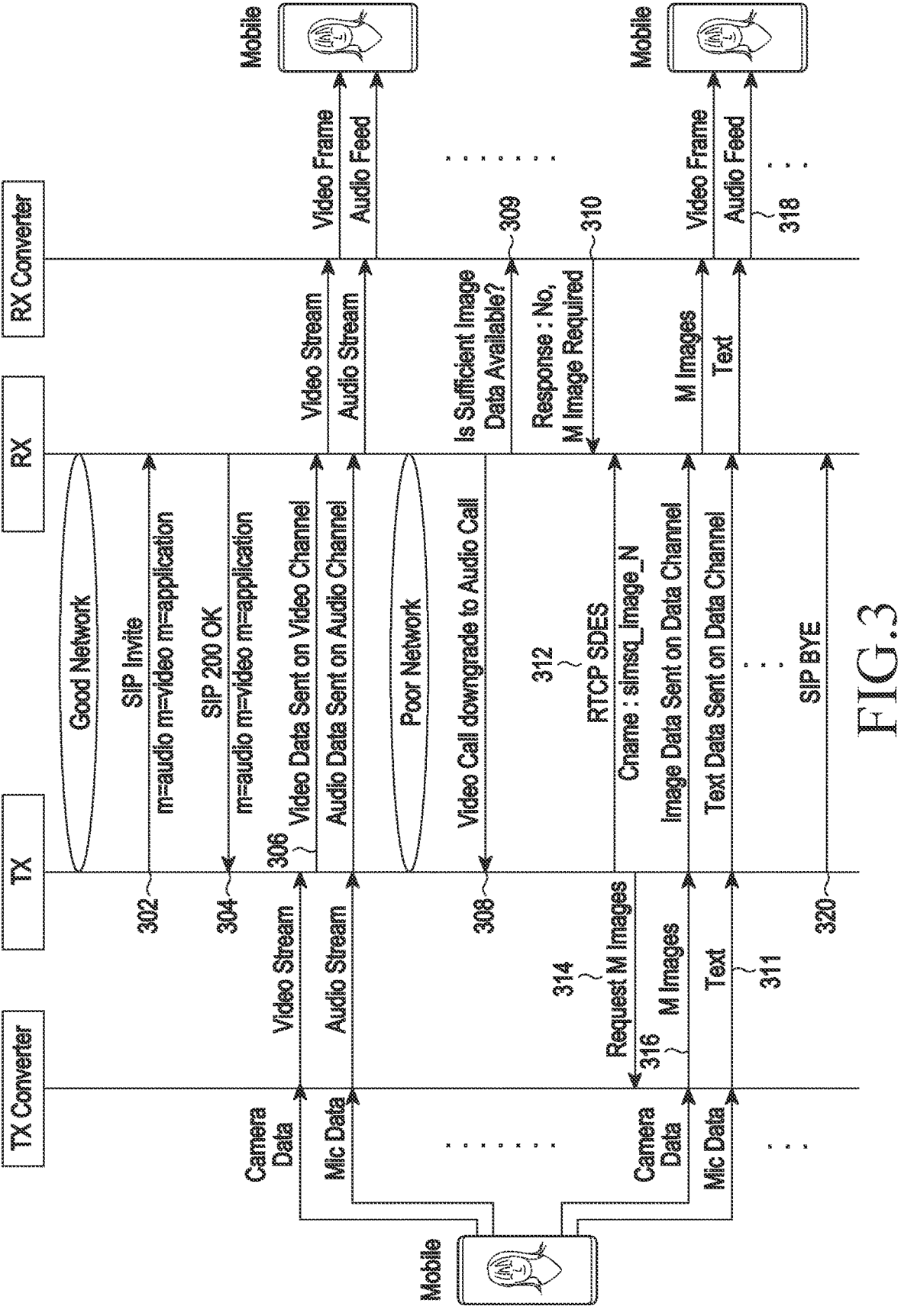
FIG. 3 illustrates a sample flow and details for negotiation and message exchange in case of an electronic device moving from good network to a poor network, according to an embodiment of the disclosure.

FIG. 3 illustrates a sample flow and details for negotiation and message exchange in case of an electronic device moving from good network to a poor network, according to an embodiment of the disclosure.

The poor network refers to a bandwidth less than of the weak network. At operation 302, the transmitter of the electronic device sends a Session Initiation Protocol (SIP) invite to the receiver of the one or more other electronic devices with Audio [m=audio], Video [m=video], and Data Channel/WebRTC [m=application] support information. At operation 304, when the transmitter receives SIP 200 ok from the receiver with the Audio, Video, and Data Channel/WebRTC [m=application] support information, at operation 306, the transmitter sends video stream on video channel and audio stream on audio, to the receiver. When the network is good, the first electronic device and the other electronic devices establish a connection with the 5G network and negotiate the available bandwidth for the video call. At operation 308, when the call gets downgraded to an audio call, due to weak network, at operation 309, the receiver of the other electronic devices queries, for example, the converter to find out if the receiver has enough image data to recreate user expressions and poses based on the audio data. At operation 310, if the receiver at the other electronic devices returns a No, i.e., if there are not enough images for recreation, then the receiver at the other electronic devices sends a request to the transmitter of the first electronic device to send M images. At operation 312, the receiver of the other electronic devices uses an RTCP SDES message for conveying the request for the M images to the transmitter of the first electronic device. According to the embodiments herein, alternative mechanisms, such as RTCP App, or Session Initiation Protocol/Session Description Protocol (SIP/SDP) based communication can also be done for exchanging images and other requests. At operation 314, the transmitter of the first electronic device sends, for example, the request for the M images to the converter at the transmitter of the first electronic device to generate N images. At operation 316, the converter at the transmitter of the first electronic device generates the M images and sends the M images over a Data Channel or WebRTC to the receiver of the other electronic devices. At operation 318, the converter at the transmitter of the first electronic device sends, for example, audio stream to the receiver of the other electronic devices by way of audio packets over Audio RTP port. At operation 320, the first electronic device ends the call with the other electronic devices by sending a SIP bye message. At operation 310, if the receiver returns a yes, i.e., if there are enough images for recreation, then at operation 311, the RTCP SDES message is sent to the transmitter of the first electronic device to send the audio data in text format.

Figure 4:
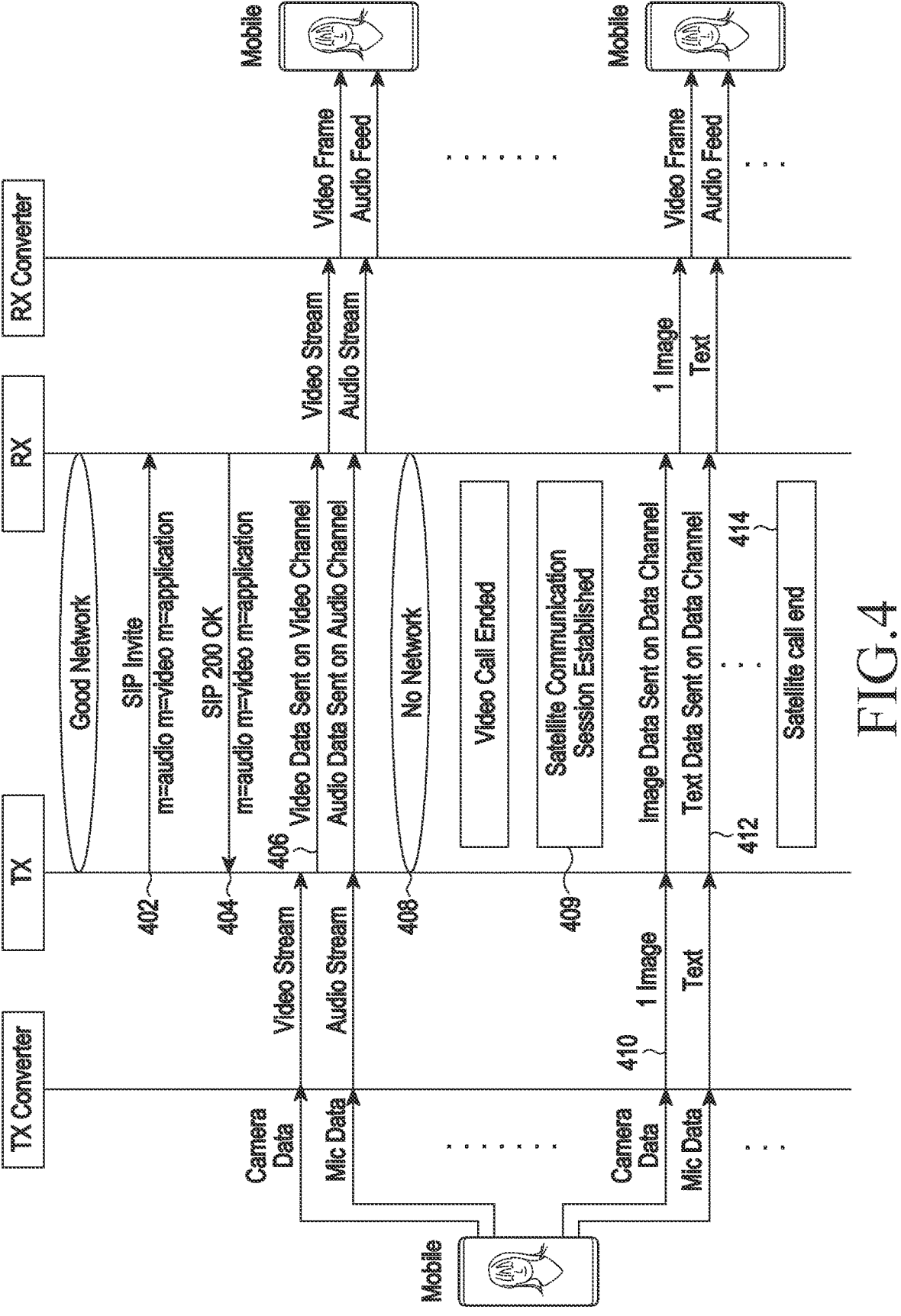
FIG. 4 illustrates a sample flow and details for negotiation and message exchange in case of an electronic device moving from good network to no network, according to an embodiment of the disclosure.

FIG. 4 illustrates a sample flow and details for negotiation and message exchange in case of an electronic device moving from good network to no network, according to an embodiment of the disclosure.

At operation 402, the transmitter of the electronic device sends a Session Initiation Protocol (SIP) invite to the receiver of the one or more other electronic devices with Audio [m=audio], Video [m=video], and Data Channel/WebRTC [m=application] support information. At operation 404, when the transmitter receives, for example, SIP 200 ok from the receiver with the Audio, Video, and Data Channel/WebRTC [m=application] support information, at operation 406, the transmitter sends video stream on video channel and audio stream on audio, to the receiver. When the network is good, the first electronic device and the other electronic devices establish a connection with the 5G network and negotiate the available bandwidth for the video call. At operation 408, when the call ends, due to no network, at operation 409, the network changes from operator-based to satellite communication as both the first electronic device and the other electronic devices support satellite communication. At operation 410, the transmitter at the first electronic device generates, for example, one image and sends the image to the receiver at the other electronic devices over Data Channel or WebRTC. At operation 412, the transmitter at the first electronic device converts the audio data into text format and sends the text over the Data Channel, or WebRTC to the receiver at the other electronic devices. At operation 414, the satellite communication ends.

Figure 5:
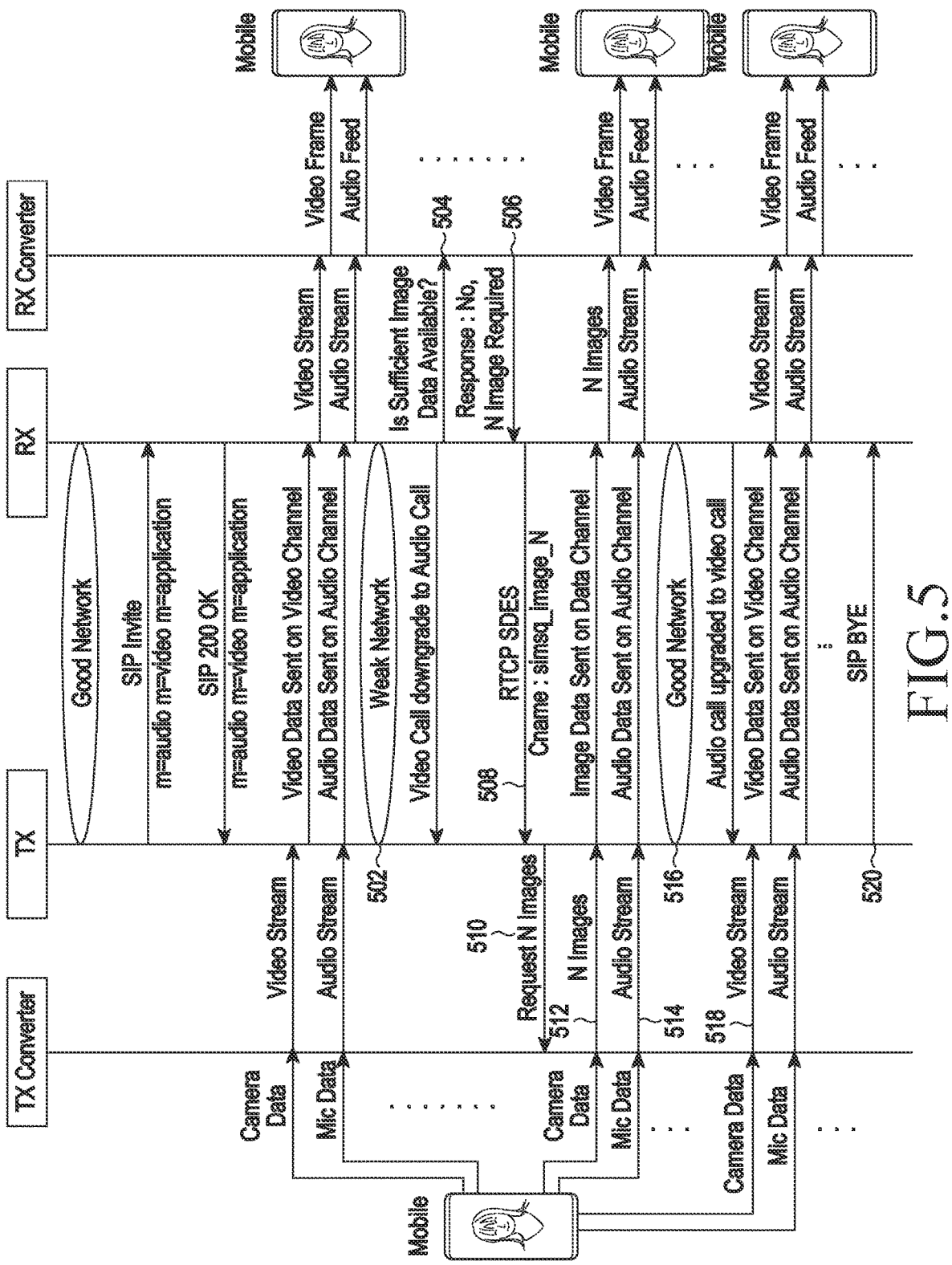
FIG. 5 illustrates a sample flow and details for negotiation and message exchange in case of an electronic device moving from a weak network to good network, according to an embodiment of the disclosure.

FIG. 5 illustrates a sample flow and details for negotiation and message exchange in case of an electronic device moving from a weak network to good network, according to an embodiment of the disclosure.

At operation 502, when the network transitions from good to weak and the call gets downgraded to an audio call, due to weak network, at operation 504, the receiver of the other electronic devices queries, for example, the converter to find out if the receiver has enough image data to recreate user expressions and poses based on the audio data. At operation 506, if the receiver at the other electronic devices returns a No, i.e., if there are not enough images for recreation, then the receiver at the other electronic devices sends a request to the transmitter of the first electronic device to send N images. At operation 508, the receiver of the other electronic devices uses an RTCP SDES message for conveying the request for the N images to the transmitter of the first electronic device. According to some embodiments herein, alternative mechanisms, such as RTCP App, or Session Initiation Protocol/Session Description Protocol (SIP/SDP) based communication can also be done for exchanging images and other requests. At operation 510, the transmitter of the first electronic device sends the request for the N images to the converter at the transmitter of the first electronic device to generate N images. At operation 512, the converter at the transmitter of the first electronic device generates, for example, the N images and sends the N images over a Data Channel or WebRTC to the receiver of the other electronic devices. At operation 514, the converter at the transmitter of the first electronic device sends audio stream to the receiver of the other electronic devices by way of audio packets over Audio RTP port. At operation 506, if the receiver returns a yes, i.e., if there are enough images for recreation, the RTCP SDES message is sent to the transmitter of the first electronic device to send the audio data in text format. When the network transitions back to good network, at operation 516, the audio call gets upgraded to a video call. At operation 518, the transmitter at the first electronic device sends, for example, video stream on video channel and audio stream on audio, to the receiver at the other electronic devices. At operation 520, the first electronic device ends the call with the other electronic devices by sending a SIP bye message.

Figure 6:
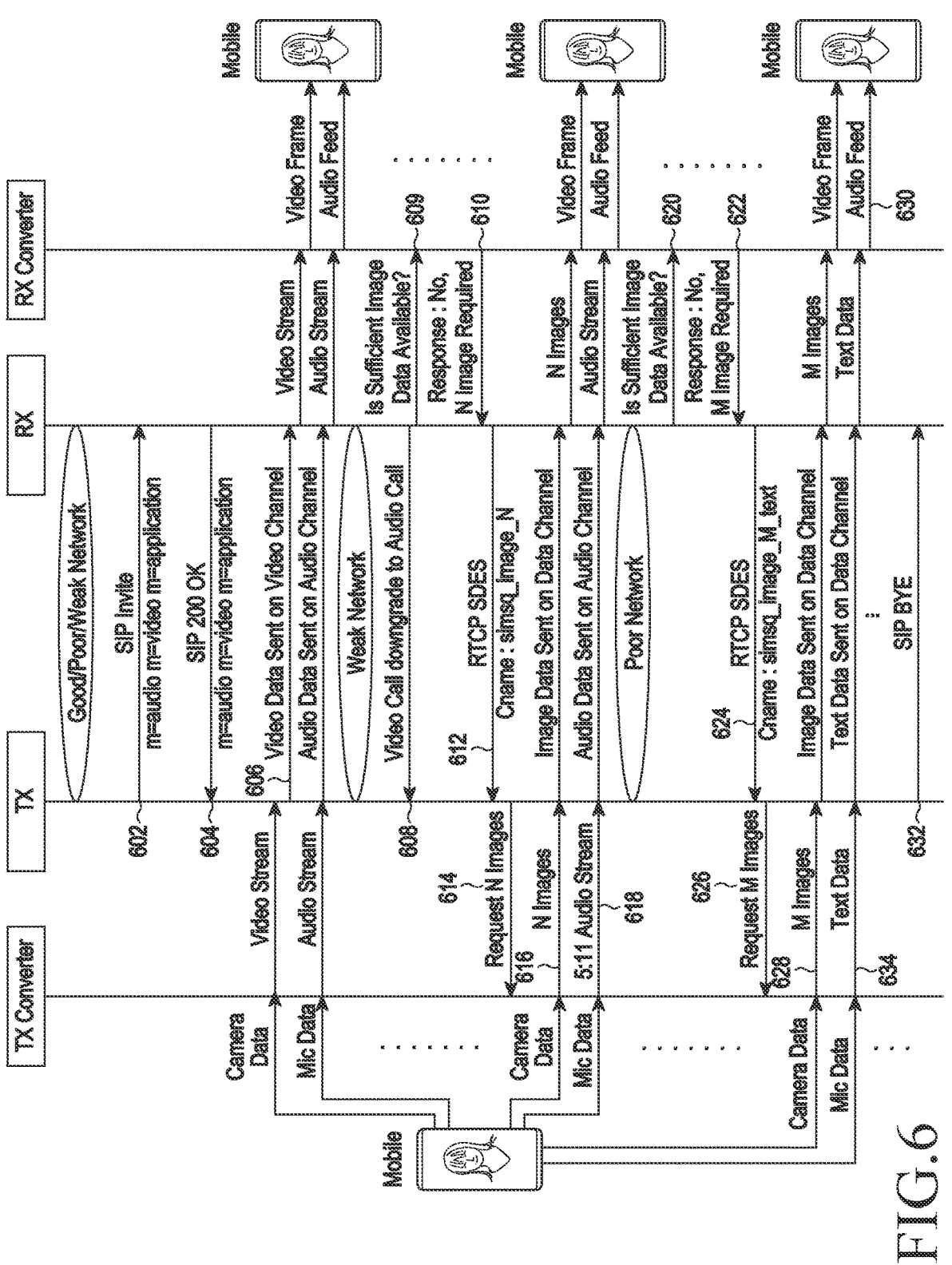
FIG. 6 illustrates a sample flow and details for negotiation and message exchange in case of an electronic device moving from a weak network to poor network, according to an embodiment of the disclosure.

FIG. 6 illustrates a sample flow and details for negotiation and message exchange in case of an electronic device moving from a weak network to poor network, according to an embodiment of the disclosure.

At operation 602, when the network is one of good, weak, and poor, the transmitter of the electronic device sends a Session Initiation Protocol (SIP) invite to the receiver of the one or more other electronic devices with Audio [m=audio], Video [m=video], and Data Channel/WebRTC [m=application] support information. At operation 604, when the transmitter receives SIP 200 ok from the receiver with the operation 606, the transmitter sends video stream on video channel and audio stream on audio, to the receiver. At operation 608, when the call gets downgraded to an audio call, due to weak network, at operation 609, the receiver of the other electronic devices queries, for example, the converter to find out if the receiver has enough image data to recreate user expressions and poses based on the audio data. At operation 610, if the receiver at the other electronic devices returns a No, i.e., if there are not enough images for recreation, then the receiver at the other electronic devices sends a request to the transmitter of the first electronic device to send N images. At operation 612, the receiver of the other electronic devices uses an RTCP SDES message for conveying the request for the N images to the transmitter of the first electronic device. According to other embodiments herein, alternative mechanisms, such as RTCP App, or Session Initiation Protocol/Session Description Protocol (SIP/SDP) based communication can also be done for exchanging images and other requests. At operation 614, the transmitter of the first electronic device sends the request for the N images to the converter at the transmitter of the first electronic device to generate N images. At operation 616, the converter at the transmitter of the first electronic device generates, for example, the N images and sends the N images over a Data Channel or WebRTC to the receiver of the other electronic devices. At operation 618, the converter at the transmitter of the first electronic device sends audio stream to the receiver of the other electronic devices by way of audio packets over Audio RTP port. At operation 620, when the network changes from weak to poor, the receiver of the other electronic devices queries, for example, the converter to find out if the receiver has enough image data to recreate user expressions and poses based on the audio data. At operation 622, if the receiver at the other electronic devices returns a No, i.e., if there are not enough images for recreation, then the receiver at the other electronic devices sends a request to the transmitter of the first electronic device to send M images. At operation 624, the receiver of the other electronic devices uses an RTCP SDES message for conveying the request for the M images to the transmitter of the first electronic device. According to the embodiments herein, alternative mechanisms, such as RTCP App, or Session Initiation Protocol/Session Description Protocol (SIP/SDP) based communication can also be done for exchanging images and other requests. At operation 626, the transmitter of the first electronic device sends, for example, the request for the M images to the converter at the transmitter of the first electronic device to generate N images. At operation 628, the converter at the transmitter of the first electronic device generates the M images and sends the M images over a Data Channel or WebRTC to the receiver of the other electronic devices. At operation 630, the converter at the transmitter of the first electronic device sends audio stream to the receiver of the other electronic devices by way of audio packets over Audio RTP port. At operation 632, the first electronic device ends, for example, the call with the other electronic devices by sending a SIP bye message. At operation 622, if the receiver returns a yes, i.e., if there are enough images for recreation, then at operation 634, the RTCP SDES message is sent to the transmitter of the first electronic device to send the audio data in text format.

Figure 7:
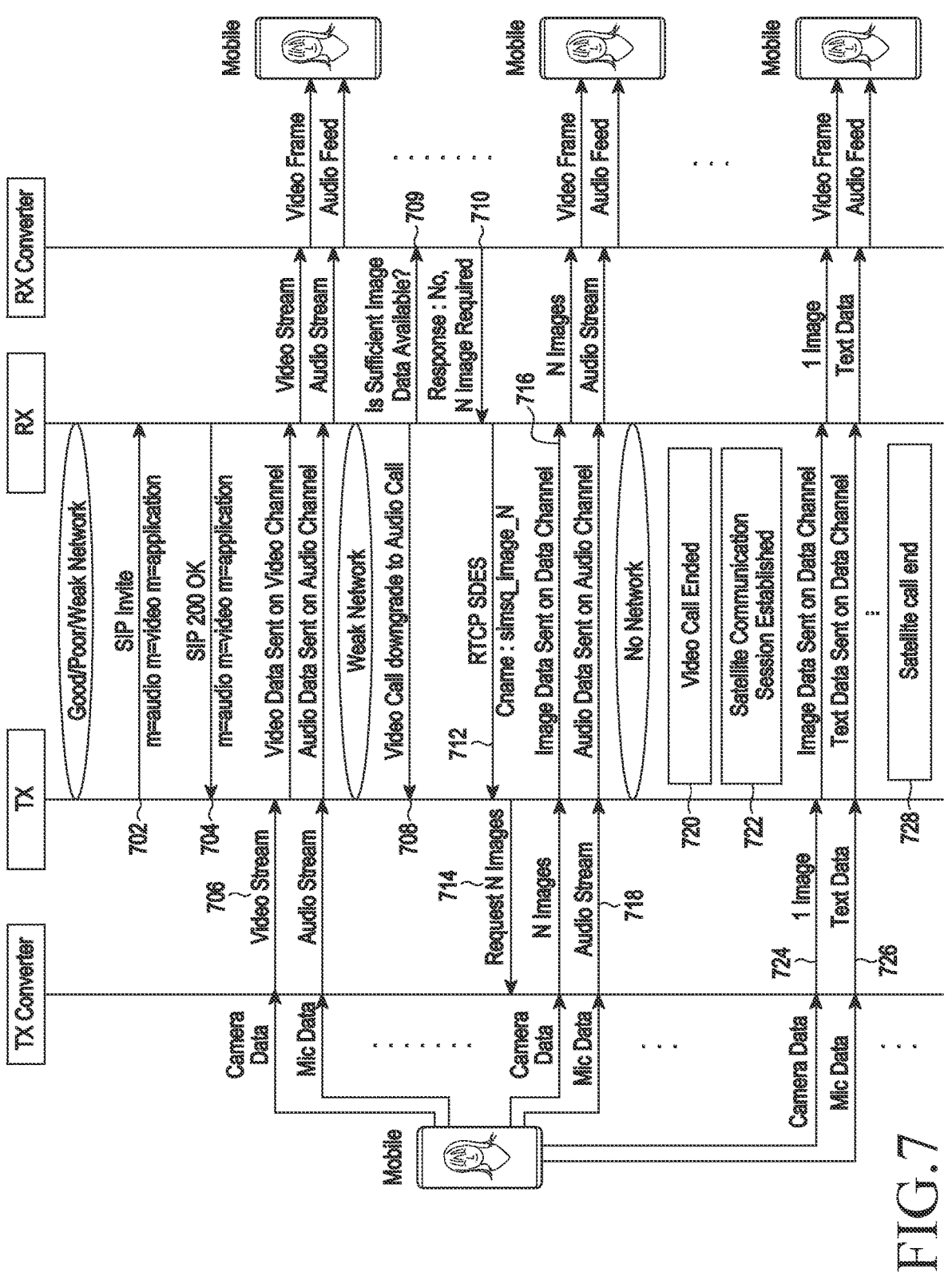
FIG. 7 illustrates a sample flow and details for negotiation and message exchange in case of an electronic device moving from a weak network to no network, according to an embodiment of the disclosure.

FIG. 7 illustrates a sample flow and details for negotiation and message exchange in case of an electronic device moving from a weak network to no network, according to an embodiment of the disclosure.

At operation 702, when the network is one of good, weak, and poor, the transmitter of the electronic device sends a Session Initiation Protocol (SIP) invite to the receiver of the one or more other electronic devices with Audio [m=audio], Video [m=video], and Data Channel/WebRTC [m=application] support information. At operation 704, when the transmitter receives SIP 200 ok from the receiver with the Audio, Video, and Data Channel/WebRTC [m=application] support information, at operation 706, the transmitter sends video stream on video channel and audio stream on audio, to the receiver. At operation 708, when the call gets downgraded to an audio call, due to weak network, at operation 709, the receiver of the other electronic devices queries, for example, the converter to find out if the receiver has enough image data to recreate user expressions and poses based on the audio data. At operation 710, if the receiver at the other electronic devices returns a No, i.e., if there are not enough images for recreation, then the receiver at the other electronic devices sends a request to the transmitter of the first electronic device to send N images. At operation 712, the receiver of the other electronic devices uses an RTCP SDES message for conveying the request for the N images to the transmitter of the first electronic device.

According to some embodiments herein, alternative mechanisms, such as RTCP App, or Session Initiation Protocol/Session Description Protocol (SIP/SDP) based communication can also be done for exchanging images and other requests. At operation 714, the transmitter of the first electronic device sends, for example, the request for the N images to the converter at the transmitter of the first electronic device to generate N images. At operation 716, the converter at the transmitter of the first electronic device generates the N images and sends the N images over a Data Channel or WebRTC to the receiver of the other electronic devices. At operation 718, the converter at the transmitter of the first electronic device sends, for example, audio stream to the receiver of the other electronic devices by way of audio packets over Audio RTP port. At operation 720, when the network changes from weak to no network, the video ends as the user moves to the no network area. At operation 722, a satellite call is established between the first electronic device and the other electronic devices as both the first electronic device and the other electronic devices support satellite communication. At operation 724, the converter at the transmitter generates, for example, a single image and sends the single image over Data Channel/WebRTC to the receiver. At operation 726, the transmitter converts the audio content into text and sends the text over the Data Channel/WebRTC to the receiver, and at operation 728, the satellite call ends.

Figure 8:
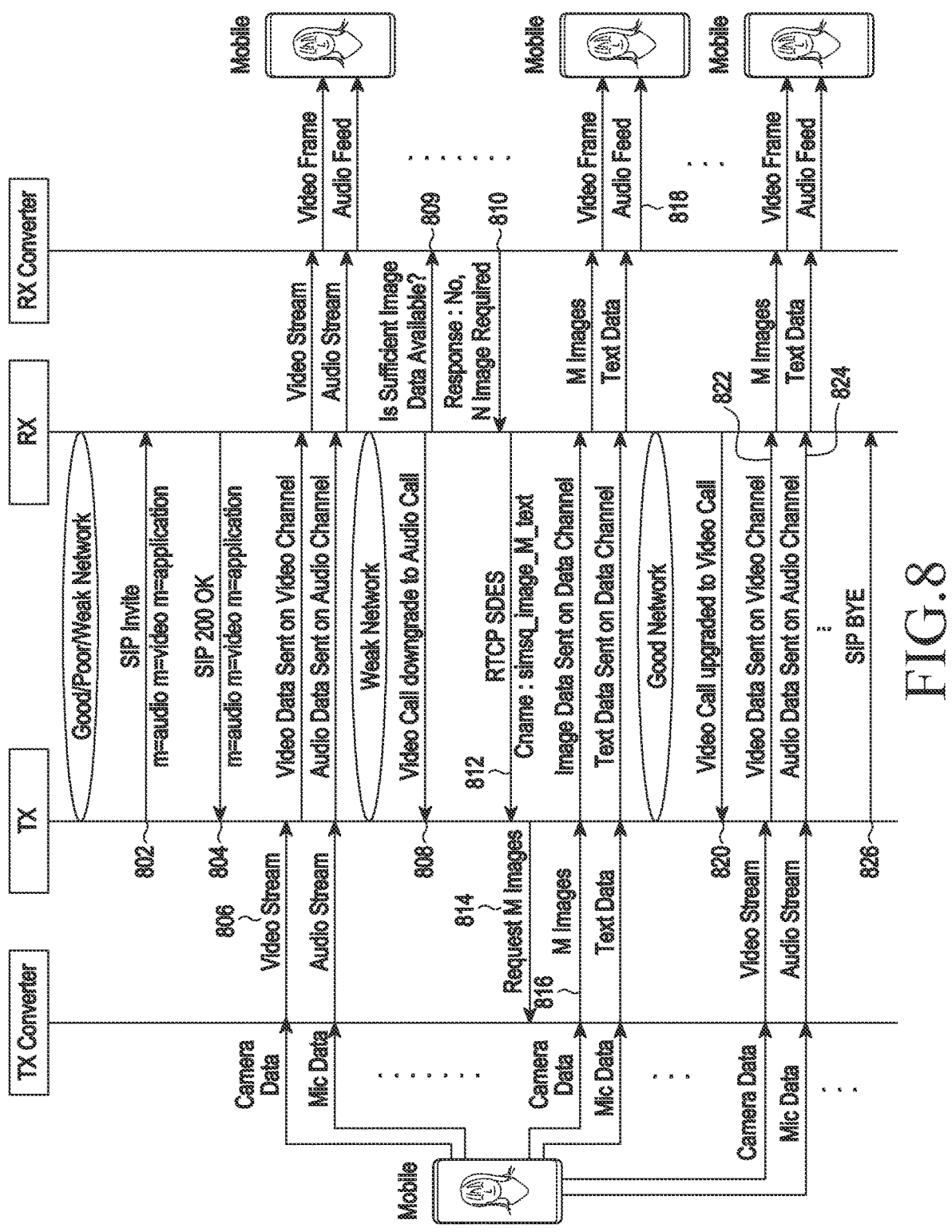
FIG. 8 illustrates a sample flow and details for negotiation and message exchange in case of an electronic device moving from a poor network to good network, according to an embodiment of the disclosure.

FIG. 8 illustrates a sample flow and details for negotiation and message exchange in case of an electronic device moving from a poor network to good network, according to an embodiment of the disclosure.

At operation 802, when the network is one of good, weak, and poor, the transmitter of the electronic device sends a Session Initiation Protocol (SIP) invite to the receiver of the one or more other electronic devices with Audio [m=audio], Video [m=video], and Data Channel/WebRTC [m=application] support information. At operation 804, when the transmitter receives SIP 200 ok from the receiver with the operation 806, the transmitter sends video stream on video channel and audio stream on audio, to the receiver. At operation 808, when the call gets downgraded to an audio call, due to poor network, at operation 809, the receiver of the other electronic devices queries, for example, the converter to find out if the receiver has enough image data to recreate user expressions and poses based on the audio data. At operation 810, if the receiver at the other electronic devices returns a No, i.e., if there are not enough images for recreation, then the receiver at the other electronic devices sends a request to the transmitter of the first electronic device to send M images. At operation 812, the receiver of the other electronic devices uses an RTCP SDES message for conveying the request for the M images to the transmitter of the first electronic device. According to the embodiments herein, alternative mechanisms, such as RTCP App, or Session Initiation Protocol/Session Description Protocol (SIP/SDP) based communication can also be done for exchanging images and other requests. At operation 814, the transmitter of the first electronic device sends, for example, the request for the M images to the converter at the transmitter of the first electronic device to generate M images. At operation 816, the converter at the transmitter of the first electronic device generates the M images and sends the M images over a Data Channel or WebRTC to the receiver of the other electronic devices. At operation 818, the converter at the transmitter of the first electronic device sends audio stream to the receiver of the other electronic devices by way of audio packets over Audio RTP port. At operation 820, when the network changes from poor network to good network, the audio call is upgraded to a video call. At operation 822, the transmitter transmits, for example, video frames over a video RTP port to the receiver. At operation 824, the transmitter transmits the audio packets over an audio RTP port to the receiver, and at operation 826, the first electronic device ends the call with the other electronic devices by sending a SIP bye message.

Figure 9:
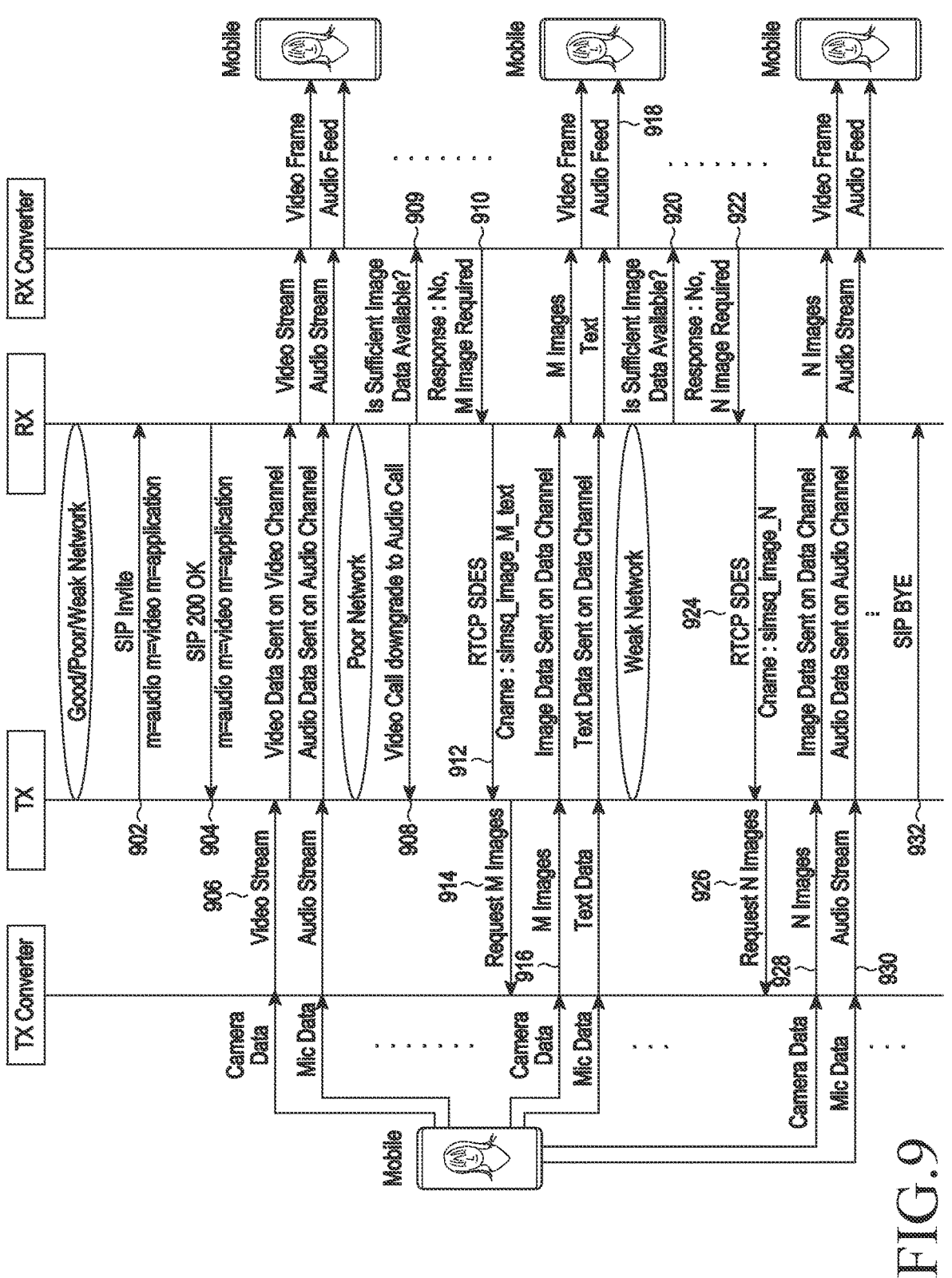
FIG. 9 illustrates a sample flow and details for negotiation and message exchange in case of an electronic device moving from a poor network to weak network, according to an embodiment of the disclosure.

FIG. 9 illustrates a sample flow and details for negotiation and message exchange in case of an electronic device moving from a poor network to weak network, according to an embodiment of the disclosure.

At operation 902, when the network is one of good, weak, and poor, the transmitter of the electronic device sends a Session Initiation Protocol (SIP) invite to the receiver of the one or more other electronic devices with Audio [m=audio], Video [m=video], and Data Channel/WebRTC [m=application] support information. At operation 904, when the transmitter receives SIP 200 ok from the receiver with the Audio, Video, and Data Channel/WebRTC [m=application] support information, at operation 906, the transmitter sends, for example, video stream on video channel and audio stream on audio, to the receiver. At operation 908, when the call gets downgraded to an audio call, due to poor network, at operation 909, the receiver of the other electronic devices queries the converter to find out if the receiver has enough image data to recreate user expressions and poses based on the audio data. At operation 910, if the receiver at the other electronic devices returns a No, i.e., if there are not enough images for recreation, then the receiver at the other electronic devices sends, for example, a request to the transmitter of the first electronic device to send M images. At operation 912, the receiver of the other electronic devices uses an RTCP SDES message for conveying the request for the M images to the transmitter of the first electronic device. According to the embodiments herein, alternative mechanisms, such as RTCP App, or Session Initiation Protocol/Session Description Protocol (SIP/SDP) based communication can also be done for exchanging images and other requests. At operation 914, the transmitter of the first electronic device sends the request for the M images to the converter at the transmitter of the first electronic device to generate M images. At operation 916, the converter at the transmitter of the first electronic device generates, for example, the M images and sends the M images over a Data Channel or WebRTC to the receiver of the other electronic devices. At operation 918, the converter at the transmitter of the first electronic device sends audio stream to the receiver of the other electronic devices by way of audio packets over Audio RTP port. At operation 920, when the network changes from poor network to weak network, the receiver of the other electronic devices queries, for example, the converter to find out if the receiver has enough image data to recreate user expressions and poses based on the audio data. At operation 922, if the receiver at the other electronic devices returns a No, i.e., if there are not enough images for recreation, then the receiver at the other electronic devices sends a request to the transmitter of the first electronic device to send N images. At operation 924, the receiver of the other electronic devices uses an RTCP SDES message for conveying the request for the N images to the transmitter of the first electronic device. According to other embodiments herein, alternative mechanisms, such as RTCP App, or Session Initiation Protocol/Session Description Protocol (SIP/SDP) based communication can also be done for exchanging images and other requests. At operation 926, the transmitter of the first electronic device sends the request for the N images to the converter at the transmitter of the first electronic device to generate N images. At operation 928, the converter at the transmitter of the first electronic device generates the N images and sends the N images over a Data Channel or WebRTC to the receiver of the other electronic devices. At operation 930, the converter at the transmitter of the first electronic device sends, for example, audio stream to the receiver of the other electronic devices by way of audio packets over Audio RTP port. At operation 932, the first electronic device ends the call with the other electronic devices by sending a SIP bye message.

Figure 10:
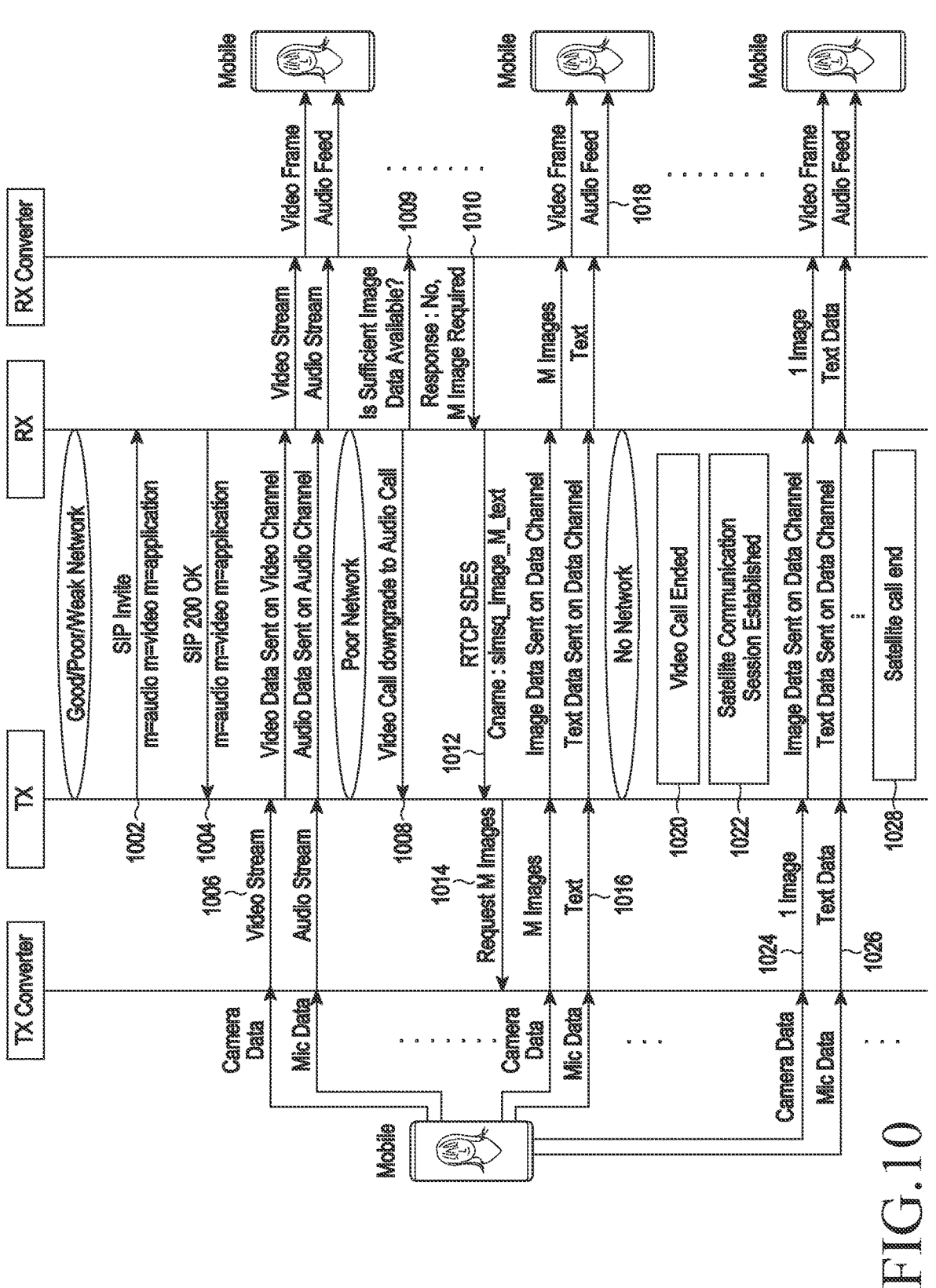
FIG. 10 illustrates a sample flow and details for negotiation and message exchange in case of an electronic device moving from a poor network to no network, according to an embodiment of the disclosure.

FIG. 10 illustrates a sample flow and details for negotiation and message exchange in case of an electronic device moving from a poor network to no network, according to an embodiment of the disclosure.

At operation 1002, when the network is one of good, weak, and poor, the transmitter of the electronic device sends a Session Initiation Protocol (SIP) invite to the receiver of the one or more other electronic devices with Audio [m=audio], Video [m=video], and Data Channel/WebRTC [m=application] support information. At operation 1004, when the transmitter receives SIP 200 ok from the receiver with the Audio, Video, and Data Channel/WebRTC [m=application] support information, at operation 1006, the transmitter sends video stream on video channel and audio stream on audio, to the receiver. At operation 1008, when the call gets downgraded to an audio call, due to poor network, at operation 1009, the receiver of the other electronic devices queries, for example, the converter to find out if the receiver has enough image data to recreate user expressions and poses based on the audio data. At operation 1010, if the receiver at the other electronic devices returns a No, i.e., if there are not enough images for recreation, then the receiver at the other electronic devices sends a request to the transmitter of the first electronic device to send M images. At operation 1012, the receiver of the other electronic devices uses an RTCP SDES message for conveying the request for the M images to the transmitter of the first electronic device. According to the embodiments herein, alternative mechanisms, such as RTCP App, or Session Initiation Protocol/Session Description Protocol (SIP/SDP) based communication can also be done for exchanging images and other requests. At operation 1014, the transmitter of the first electronic device sends, for example, the request for the M images to the converter at the transmitter of the first electronic device to generate M images. At operation 1016, the converter at the transmitter of the first electronic device generates the M images and sends the M images over a Data Channel or WebRTC to the receiver of the other electronic devices. At operation 1018, the converter at the transmitter of the first electronic device sends, for example, audio stream to the receiver of the other electronic devices by way of audio packets over Audio RTP port. At operation 1020, when there is no network, the video call ends and, at operation 1022, satellite communication session is established. At operation 1024, the converter at the transmitter side generates a single image and sends the single image to the receiver over a Data Channel/WebRTC. At operation 1026, the converter at the transmitter side converts the audio content to a text and sends the converted text to the receiver over a Data Channel/WebRTC. At operation 1028, the satellite communication ends.

Figure 11:
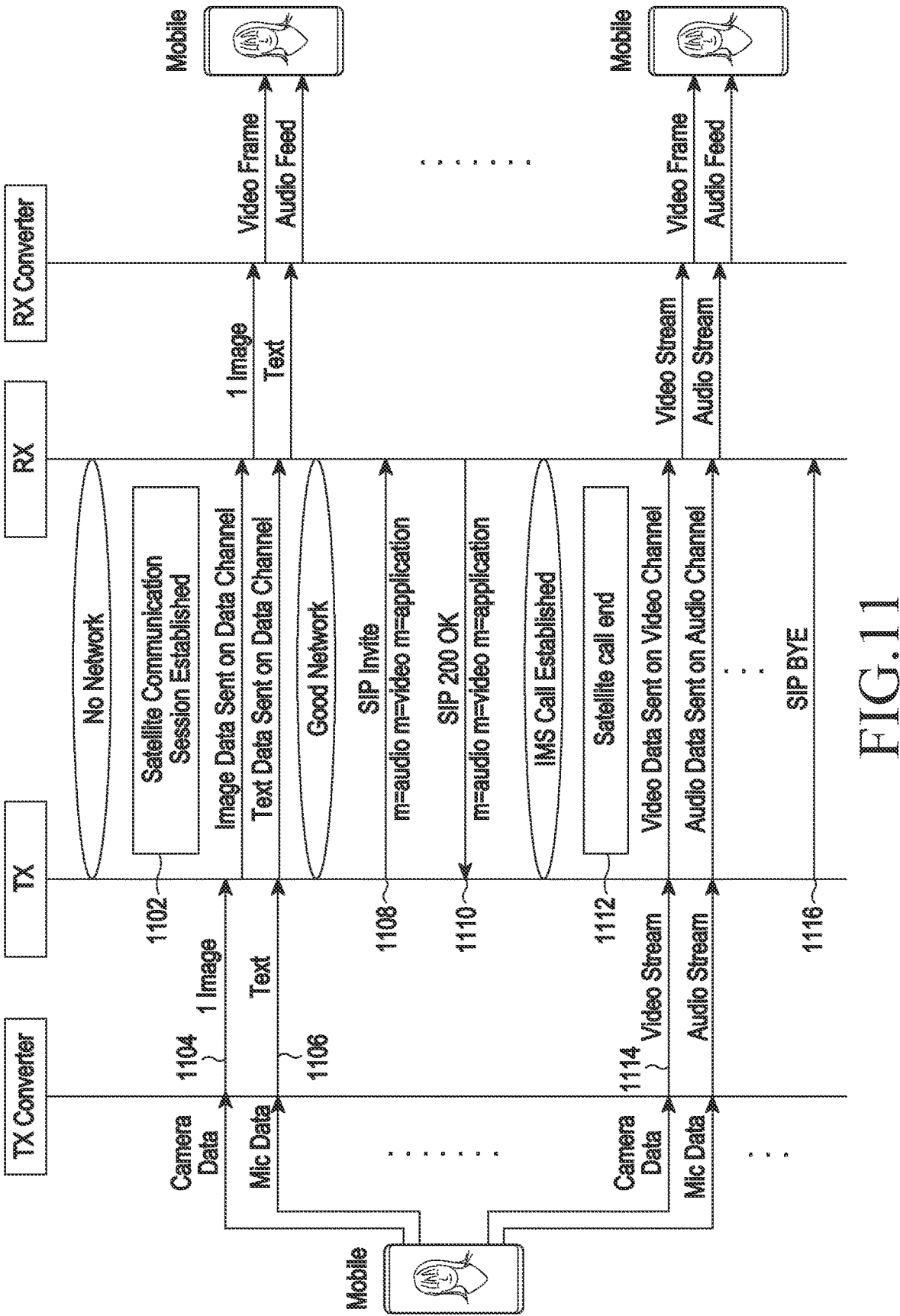
FIG. 11 illustrates a sample flow and details for negotiation and message exchange in case of an electronic device moving from no network to good network, according to an embodiment of the disclosure.

FIG. 11 illustrates a sample flow and details for negotiation and message exchange in case of an electronic device moving from no network to good network, according to an embodiment of the disclosure.

At operation 1102, when there is no network, a satellite communication session is established. At operation 1104, the converter at the transmitter side generates a single image and sends the single image to the receiver over a Data Channel/WebRTC. At operation 1106, the converter at the transmitter side converts, for example, the audio content to a text and sends the converted text to the receiver over a Data Channel/WebRTC. At operation 1108, when the network changes to good network, the transmitter of the electronic device sends a Session Initiation Protocol (SIP) invite to the receiver of the one or more other electronic devices with Audio [m=audio], Video [m=video], and Data Channel/WebRTC [m=application] support information. At operation 1110, when the transmitter receives SIP 200 ok from the receiver with the Audio, Video, and Data Channel/WebRTC [m=application] support information. At operation 1112, the satellite call ends as soon as the IMS call is established. At operation 1114, the transmitter sends, for example, video stream on video channel and audio stream on audio, to the receiver. At operation 1116, the first electronic device ends the call with the other electronic devices by sending a SIP bye message.

Figure 12:
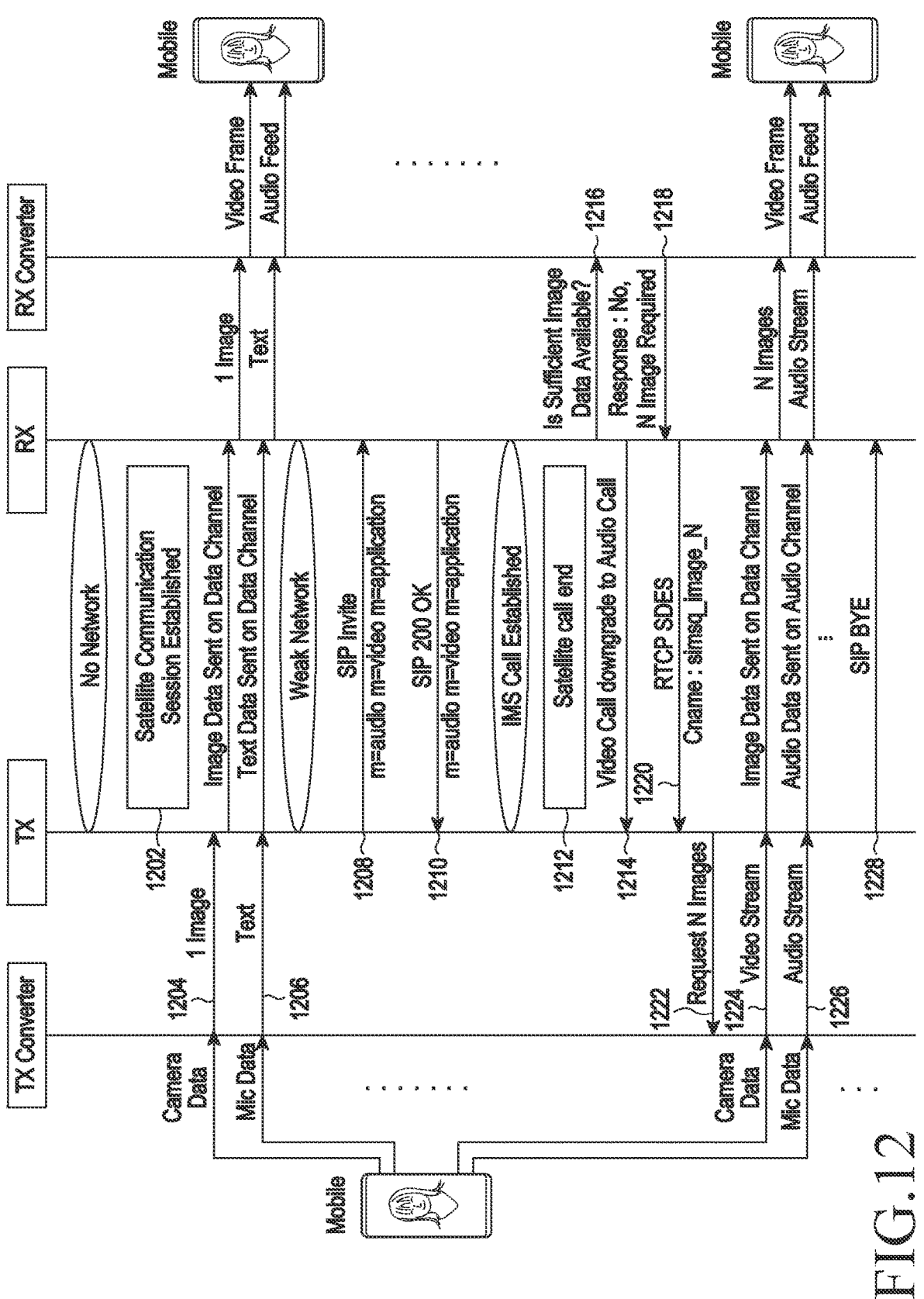
FIG. 12 illustrates a sample flow and details for negotiation and message exchange in case of an electronic device moving from no network to weak network, according to an embodiment of the disclosure.

FIG. 12 illustrates a sample flow and details for negotiation and message exchange in case of an electronic device moving from no network to weak network, according to an embodiment of the disclosure.

At operation 1202, when there is no network, a satellite communication session is established. At operation 1204, the converter at the transmitter side generates a single image and sends the single image to the receiver over a Data Channel/WebRTC. At operation 1206, the converter at the transmitter side converts, for example, the audio content to a text and sends the converted text to the receiver over a Data Channel/WebRTC. At operation 1208, when the network changes to weak network, the transmitter of the electronic device sends a Session Initiation Protocol (SIP) invite to the receiver of the one or more other electronic devices with Audio [m=audio], Video [m=video], and Data Channel/WebRTC [m=application] support information. At operation 1210, when the transmitter receives SIP 200 ok from the receiver with the Audio, Video, and Data Channel/WebRTC [m=application] support information. At operation 1212, the satellite call ends as soon as the IMS call is established. Since the network changes from no network to weak network, at operation 1214, video calls gets downgraded to an audio call. At operation 1216, the receiver of the other electronic devices queries, for example, the converter to find out if the receiver has enough image data to recreate user expressions and poses based on the audio data. At operation 1218, if the receiver at the other electronic devices returns a No, i.e., if there are not enough images for recreation, then the receiver at the other electronic devices sends, for example, a request to the transmitter of the first electronic device to send N images. At operation 1220, the receiver of the other electronic devices uses an RTCP SDES message for conveying the request for the N images to the transmitter of the first electronic device. According to the embodiments herein, alternative mechanisms, such as RTCP App, or Session Initiation Protocol/Session Description Protocol (SIP/SDP) based communication can also be done for exchanging images and other requests. At operation 1222, the transmitter of the first electronic device sends the request for the N images to the converter at the transmitter of the first electronic device to generate N images. At operation 1224, the converter at the transmitter of the first electronic device generates the N images and sends the N images over a Data Channel or WebRTC to the receiver of the other electronic devices. At operation 1226, the converter at the transmitter of the first electronic device sends, for example, audio stream to the receiver of the other electronic devices by way of audio packets over Audio RTP port. At operation 1228, the first electronic device ends the call with the other electronic devices by sending a SIP bye message.

Figure 13:
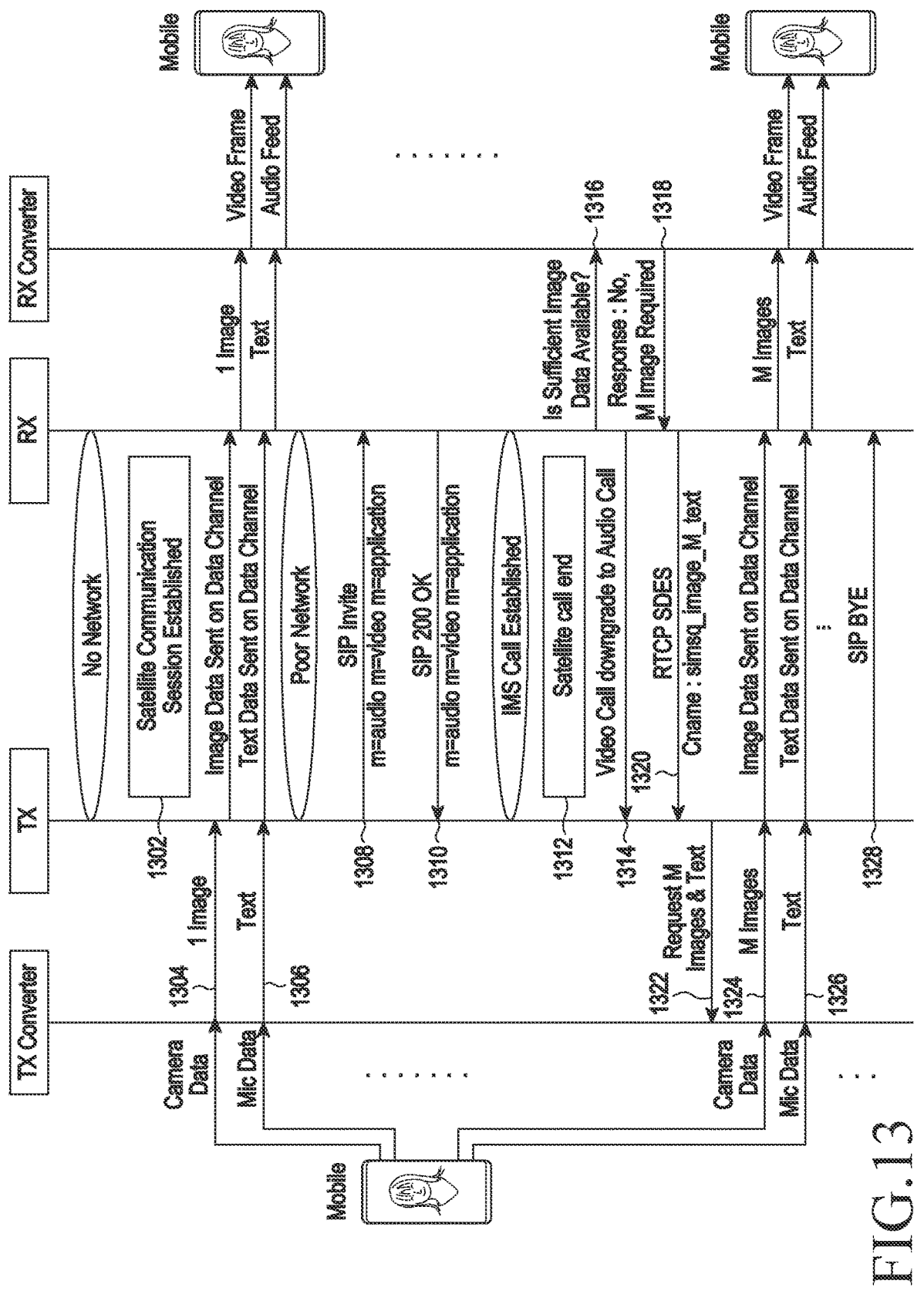
FIG. 13 illustrates a sample flow and details for negotiation and message exchange in case of an electronic device moving from no network to poor network, according to an embodiment of the disclosure.

FIG. 13 illustrates a sample flow and details for negotiation and message exchange in case of an electronic device moving from no network to poor network, according to an embodiment of the disclosure.

At operation 1302, when there is no network, a satellite communication session is established. At operation 1304, the converter at the transmitter side generates a single image and sends the single image to the receiver over a Data Channel/WebRTC. At operation 1306, the converter at the transmitter side converts the audio content to a text and sends the converted text to the receiver over a Data Channel/WebRTC. At operation 1308, when the network changes to poor network, the transmitter of the electronic device sends, for example, a Session Initiation Protocol (SIP) invite to the receiver of the one or more other electronic devices with Audio [m=audio], Video [m=video], and Data Channel/WebRTC [m=application] support information. At operation 1310, when the transmitter receives SIP 200 ok from the receiver with the Audio, Video, and Data Channel/WebRTC [m=application] support information. At operation 1312, the satellite call ends as soon as the IMS call is established. Since the network changes from no network to weak network, at operation 1314, video calls get downgraded to an audio call. At operation 1316, the receiver of the other electronic devices queries, for example, the converter to find out if the receiver has enough image data to recreate user expressions and poses based on the audio data. At operation 1318, if the receiver at the other electronic devices returns a No, i.e., if there are not enough images for recreation, then the receiver at the other electronic devices sends a request to the transmitter of the first electronic device to send M images. At operation 1320, the receiver of the other electronic devices uses an RTCP SDES message for conveying the request for the M images to the transmitter of the first electronic device. According to the embodiments herein, alternative mechanisms, such as RTCP App, or Session Initiation Protocol/Session Description Protocol (SIP/SDP) based communication can also be done for exchanging images and other requests. At operation 1322, the transmitter of the first electronic device sends, for example, the request for the M images to the converter at the transmitter of the first electronic device to generate M images. At operation 1324, the converter at the transmitter of the first electronic device generates the M images and sends the M images over a Data Channel or WebRTC to the receiver of the other electronic devices. At operation 1326, the converter at the transmitter of the first electronic device sends audio stream to the receiver of the other electronic devices by way of audio packets over Audio RTP port. At operation 1328, the first electronic device ends the call with the other electronic devices by sending a SIP bye message.

Figure 14:
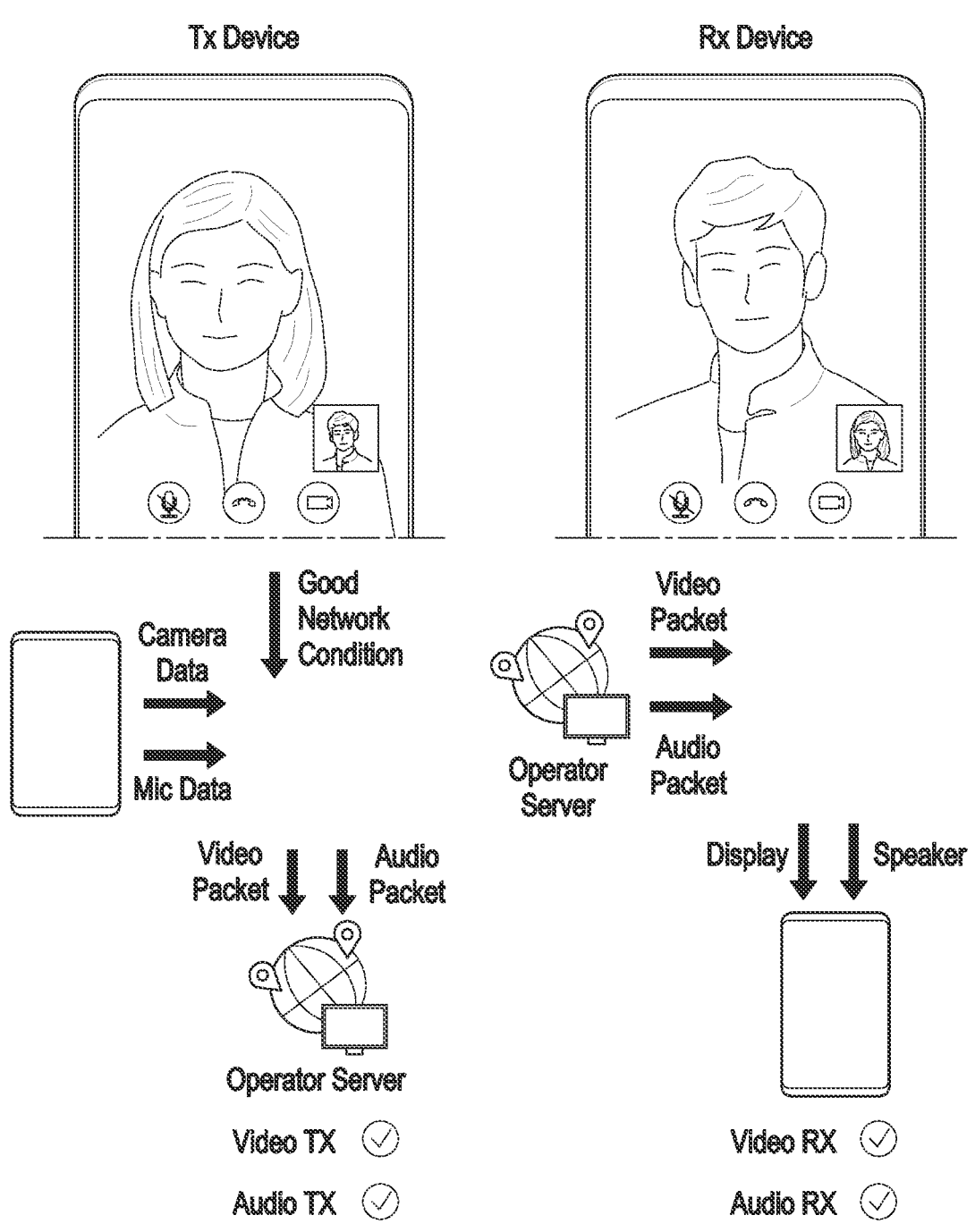
FIG. 14 depicts an example scenario, wherein network conditions are good, according to an embodiment of the disclosure.

FIG. 14 depicts an example scenario, wherein network conditions are good, according to an embodiment of the disclosure.

Figure 15:
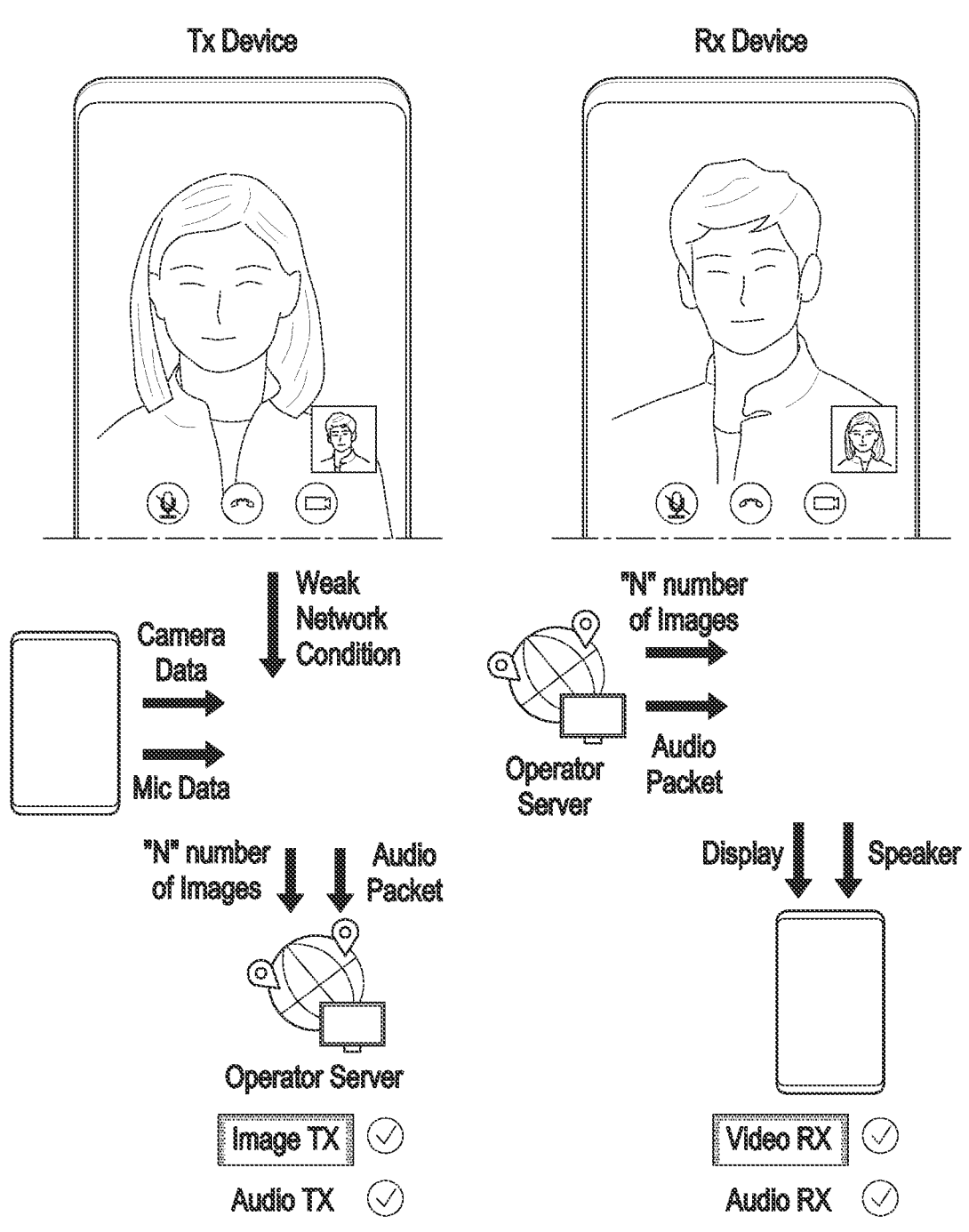
FIG. 15 depicts an example scenario, wherein network conditions are weak at a Tx device, according to an embodiment of the disclosure.

FIG. 15 depicts an example scenario, wherein network conditions are weak at a Tx device, according to an embodiment of the disclosure.

Figure 16:
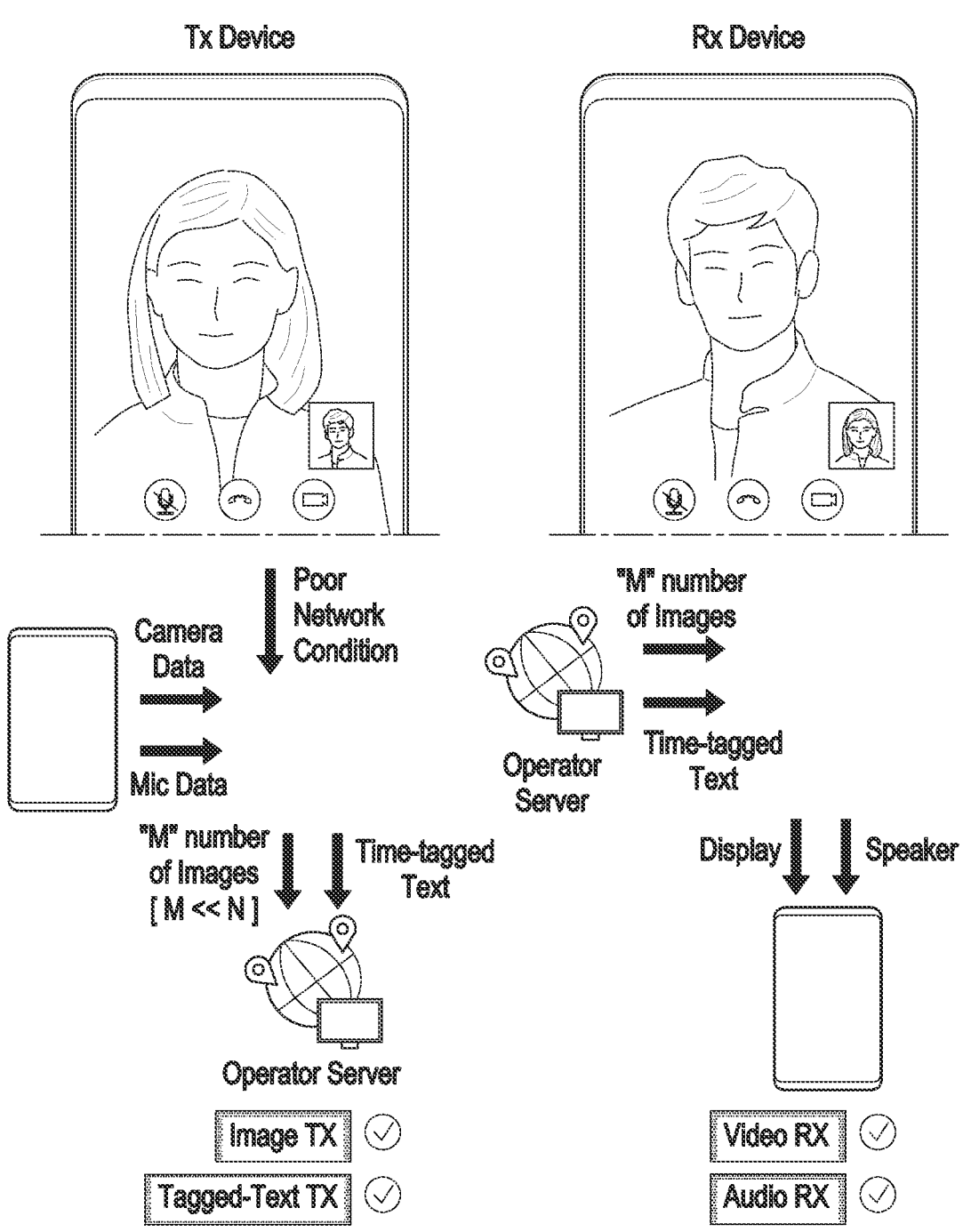
FIG. 16 depicts an example scenario, wherein network conditions are poor at a Tx device, according to an embodiment of the disclosure.

FIG. 16 depicts an example scenario, wherein network conditions are poor at a Tx device, according to an embodiment of the disclosure.

Figure 17:
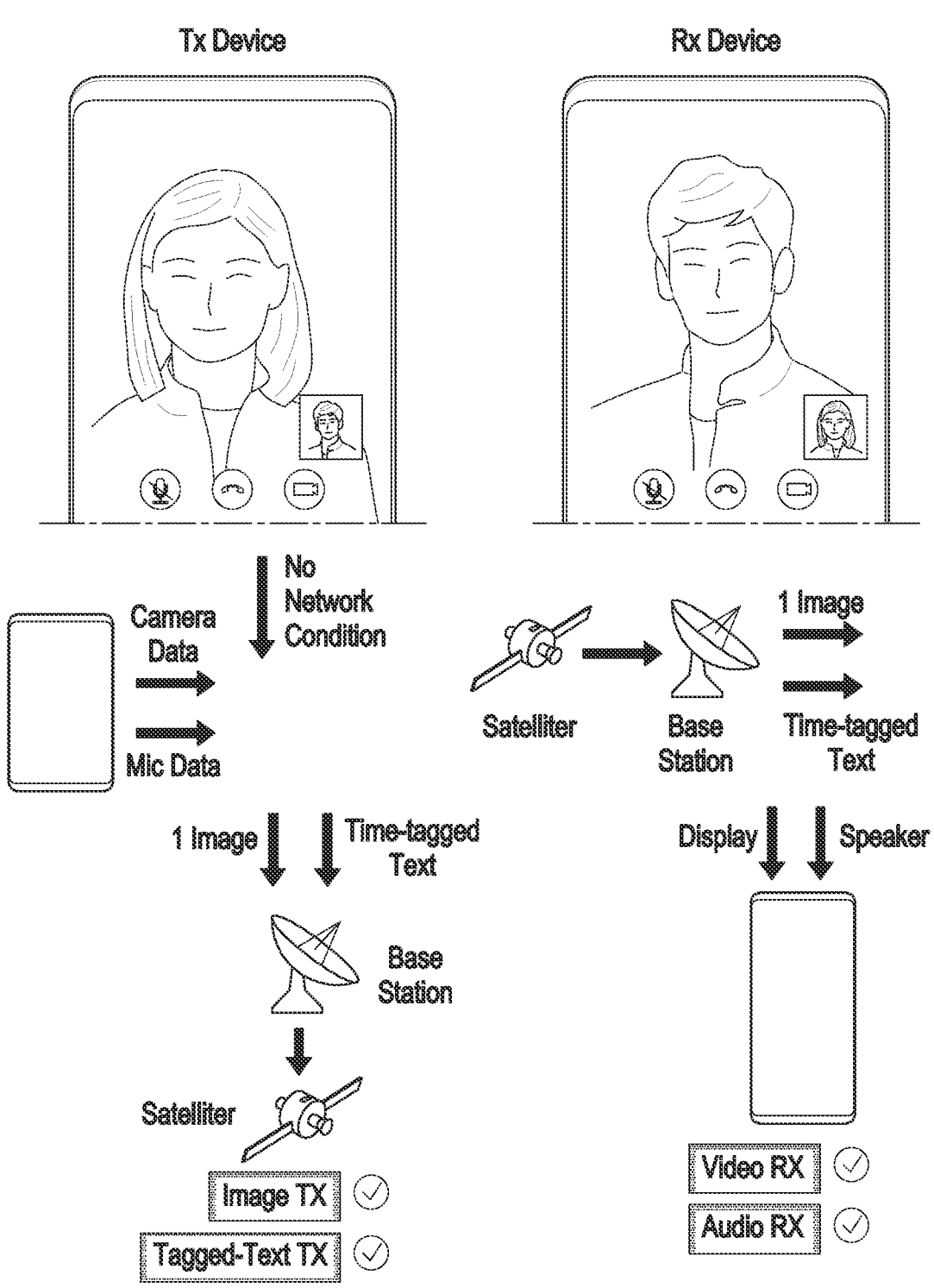
FIG. 17 depicts an example scenario, wherein there is no network at a Tx side, according to an embodiment of the disclosure.

FIG. 17 depicts an example scenario, wherein there is no network at a Tx side, according to an embodiment of the disclosure.

Figure 18A:
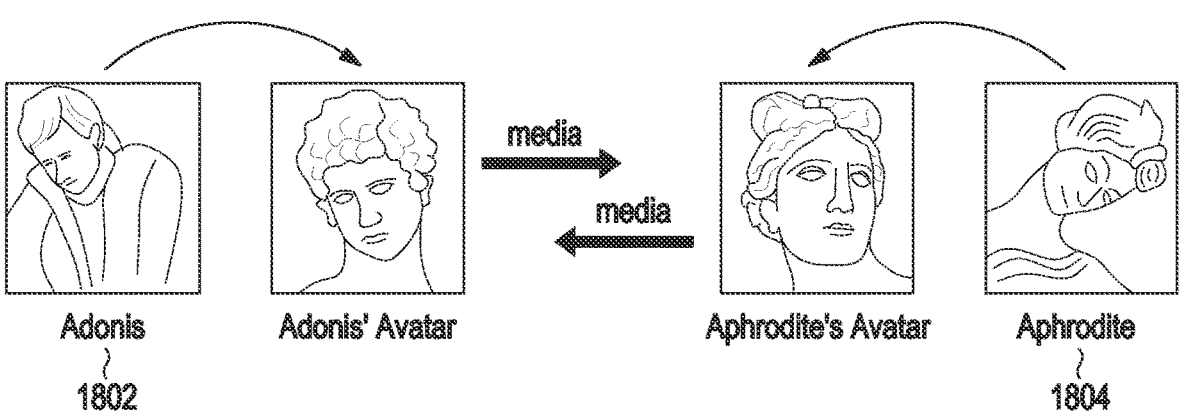
FIG. 18A illustrates an example of a text-based Avatar Media enabling an avatar call without camera support on a user equipment (UE), according to an embodiment of the disclosure.

Approved Use Cases as Per Third Generation Partnership Project (3GPP) 22.856 Requirements Use Case of IMS-Based 3D Avatar Communication FIG. 18A illustrates an example of a text-based Avatar Media enabling an avatar call without camera support on a UE, according to an embodiment of the disclosure.

In the terminology of this use case, avatar refers to a digital representation of a user. In an embodiment, the digital representation is exchanged with other media, such as audio, with one or more users as mobile metaverse media. An avatar call is similar to a video call, as both are visual, interactive, and provide live feedback to participants regarding their emotions, attentiveness, and other social information. Avatar calls may be more private, i.e., neither reveal the environment where the callers are, nor their actual appearances. An avatar may be preferable in cases where a user may not feel presentable, may want to make a specific impression, or may have to communicate only when limited data communication is possible. When compared to a video call, an avatar call requires only a very constrained data rate, for example, 5 kbps, to support. Therefore, key avatar technologies are means to capture facial and calculate values according to a model, efficiently send both media and model components though a communication channel, both initially and over time, and produce media for presentation to a user for the duration of the communication.

Following are the scenarios considered in this use case:
1. An IMS user initiates an avatar call.
2. IMS users initiate a video call, but one or both users decide instead to provide avatar call representation instead of a video representation.

For both (1) and (2), the goal is to capture sensing data of the communicating users, especially facial data, to create an animated user digital representation, i.e., an avatar. This media is provided to communicating users as a new teleservice user experience enabled by the IMS. Another scenario (3) is that a user interacts with a computer-generated system. Avatar communication is used to generate an appearance for a simulated entity with whom the user communicates.

Figure 18B:
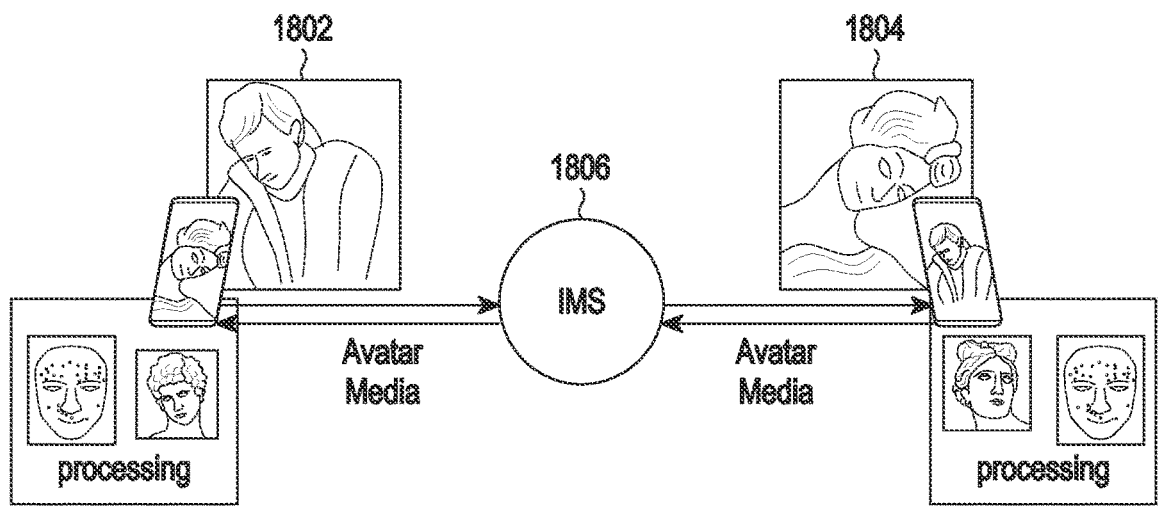
FIG. 18B illustrates the scenario (1) of the IP Multimedia Subsystem (IMS) users initiating an avatar call, according to an embodiment of the disclosure.
Figure 18C:
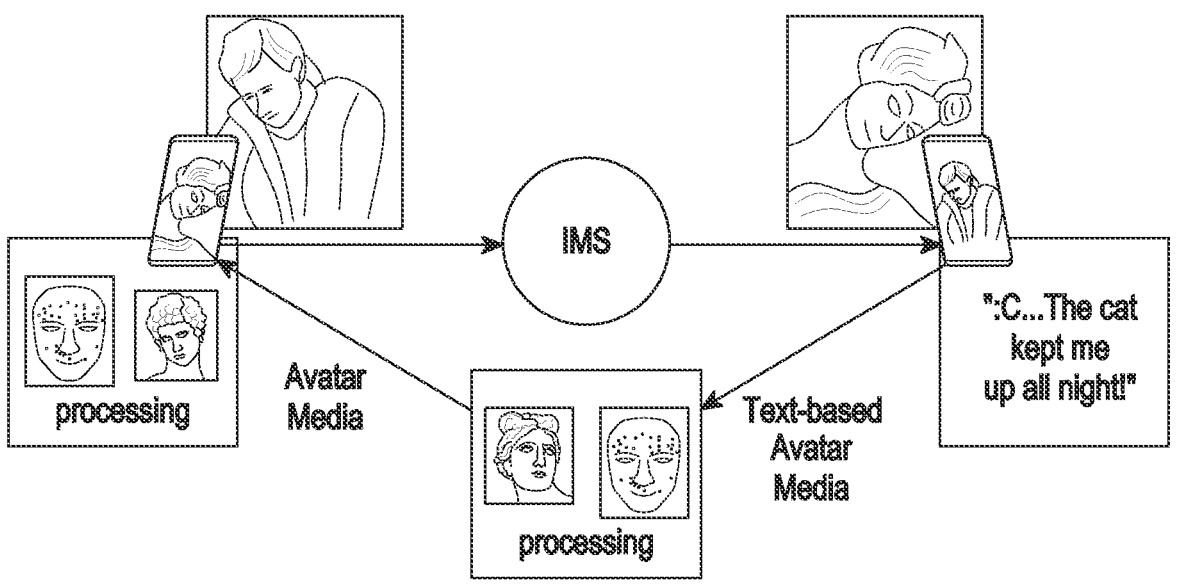
FIG. 18C illustrates the scenarios where a user interacts with a computer-generated system, according to an embodiment of the disclosure.

FIGS. 18A, 18B, and 18C show two users Adonis 1802 and Aphrodite 1804 who are 3GPP subscribers according to various embodiments of the disclosure.

Both the users have terminal equipment to capture their facial expression and movements adequately for computing avatar modeling information. In an embodiment, the terminal equipment also includes a display, for example, a screen, to display visual media. The terminal equipment is capable of initiating and terminating the IMS multimedia application "avatar call". In another embodiment, the terminal equipment is also capable of capturing the facial appearance and movements sufficiently to produce data required by a Facial Action Coding System (FACS). A network accessible service is capable of initiating and terminating an IMS session and the IMS multimedia application "avatar call".

FIG. 18B illustrates the scenario (1) of the IMS users initiating an avatar call, according to an embodiment of the disclosure.

Adonis is on a business trip and is tired after a day servicing industrial equipment. Adonis calls Aphrodite who is several time zones away and is reading in bed after an exhausting day. Adonis does not want to initiate a video call since he hasn't had a chance to clean up and is still at work, surrounded by machines. Adonis initiates an "avatar call"

1806 explicitly with his terminal equipment interface. Aphrodite who is several time zones away, reading in bed after an exhausting day, is alerted of an incoming call. Aphrodite notices that it is an avatar call coming from Adonis and accepts the call, satisfied that she would be presented on the call as an avatar. The media that is provided uplink is generated on each terminal. This is analogous to the way in which speech and video codecs operate today. Once the avatar call is established, the communicating parties provide information uplink. The terminal:

(a) captures facial information of the call participants;

(b) locally determines an encoding that captures the facial information, for example, consisting of data points, colouring, and other metadata. This information is transmitted as a form of media uplink, and provided by the IMS to the other participants in the avatar call; and (c) When the media is received by a participant, the media is rendered as a two-, or three-dimensional digital representation, as shown in FIGS. 18A and 18B as the "comic figure" 1804 on the right.

The UE performs processing of the data acquired by the UE to generate the avatar codec. It is possible to send the acquired data, for example, video data from more than one camera, uplink so that the avatar codec could be rendered by the 5G network. It is however advantageous from a service perspective to support this capability in the UE. First, the uplink data requirement is greatly reduced. Second, the confidentiality of the captured data could prevent the user from being willing to expose it to the network. Third, the avatar may not be based on sensor data at all, if it is a 'software-generated' avatar, as by a game, or other application, and the like. In this case, there is no sensor data to send uplink to be rendered.

FIG. 18B illustrates the scenario (2) of the IMS users initiating a video call, but one or both users deciding instead to provide Avatar Call representation instead of video representation, according to an embodiment of the disclosure.

Consider Adonis standing at a place like Mount Olympus and initiating a video call with Aphrodite. Adonis has forgotten to consider the time zone difference. For Aphrodite, it is the middle of the night and Aphrodite has been up for several hours in the middle of the night and is not in a position to accept the video call and prefers to be presented by an avatar. She, therefore, explicitly requests an "avatar presentation" instead of a "video presentation" and picks up Adonis' call. The call between Adonis and Aphrodite is established. Adonis sees Aphrodite's avatar representation. Aphrodite sees Adonis in the video media received as a part of the call. Adonis walks further along the mountain trail while still speaking to Aphrodite. The coverage gets worse until it is no longer possible to transmit the video uplink adequately. Rather than switching to a voice-only call, Adonis activates 'avatar call' representation. This requires negligible data throughput. Therefore, Adonis and Aphrodite are able to interact with each other using the avatar call.

FIG. 18C illustrates the scenarios where a user interacts with a computer-generated system, according to an embodiment of the disclosure.

Consider that Aphrodite calls an automated customer service. Aphrodite calls a customer service of a company "Inhabitabilis" to initiate a video call. Inhabitabilis customer service employs a 'receptionist' named Nemo, who is actually not a person at all. Nemo is a software construct which operates based on an artificial intelligence algorithm that generates his utterances. At the same time, an appearance is generated as a set of code points using a FACS system, corresponding to the dialog and interaction between Aphrodite and Nemo. Aphrodite is able to get answers to her questions and thanks Nemo.

In all the above scenarios, the following applies.

i) Aphrodite calls Adonis and wants to share an avatar call. She cannot however be captured via FACS due to a lack of sufficient camera support on her UE. Instead, she uses text-based avatar media.

ii) The text-based avatar media is transported to the point at which this media is rendered as a 3D avatar media codec. The transcoding rendering of the avatar media to 3D avatar media could be at any point in the system Aphrodite's UE, the network, or Adoni's UE.

iii) Adoni's UE is able to display an avatar version of Aphrodite and hear it speak, i.e., text to voice. To the extent that the avatar configuration and voice generation configuration is well associated with the Aphrodite, Adonis can hear and see her speaking, though Aphrodite only provides text as input to the conversation.

Another possible scenario is Aphrodite using a terminal device without cameras, or whose cameras are insufficient and/or Adonis using a terminal device without avatar codec support. In this example, the UE used by either calling party is not able to support an IMS 3D avatar call. Through the use of transcoding, this lack of support can be overcome. In the service flow as shown in FIG. 18C, as an example, Aphrodite's UE cannot capture her visually so as to generate an avatar encoding, so she expresses herself in text.

In each of the scenarios above, avatar media provides an acceptable interactive choice for a video call experience. The advantages are privacy, efficiency, and ease of integration with computer software to animate a simulated conversational partner.

Figure 19A:
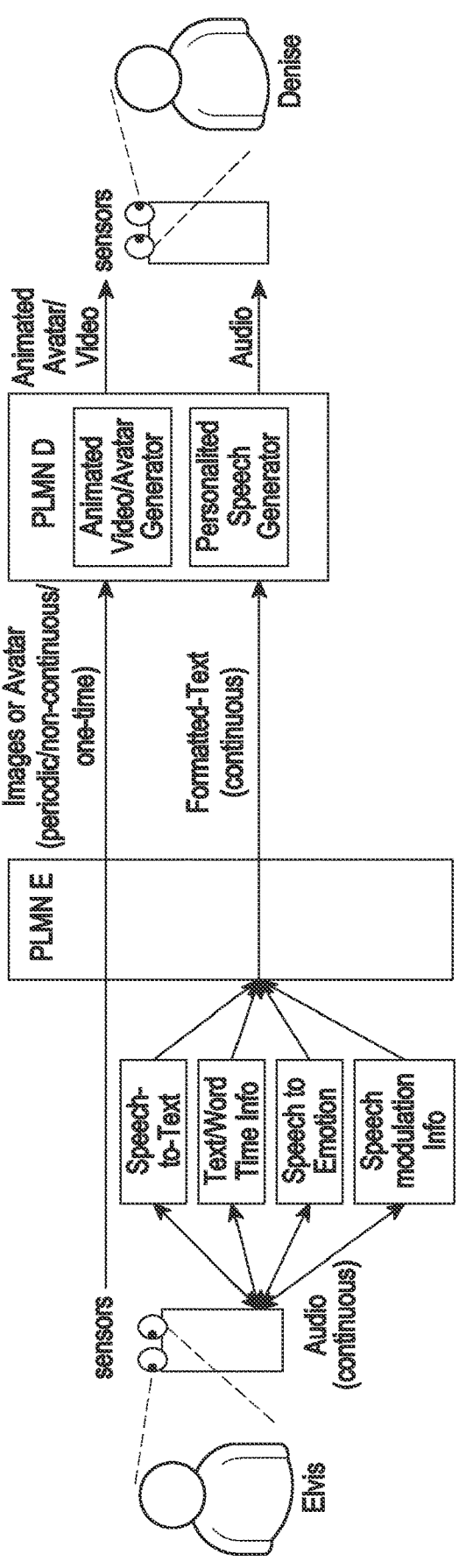
FIG. 19A depicts an example scenario, wherein an IMS three dimensional (3D) avatar call and audio is ongoing between two callers with very limited network bandwidth, according to an embodiment of the disclosure.

FIG. 19A depicts an example scenario, wherein an IMS 3D avatar call and audio is ongoing between two callers with very limited network bandwidth according to an embodiment of the disclosure.

In this scenario, Elvis is in a fluctuating network area with public land mobile network (PLMN) E, where majorly it is encountering a very weak network signal, while Denise is in a good network area. Elvis still wants to make an immersive video call, so it chooses to start a call, which is a Formatted-text based Avatar call on his end, while being a video call at Denise's end. Elvis' terminal sends images or avatar information at the beginning of the session, in a one-time or non-continuous manner. It also converts Elvis' speech to text along with time/emotion voice-modulation setting info and send it in messages continuously. The PLMN D uses the image or avatar information to reconstruct Elvis's Animated Avatar. It also uses the formatted text and other metadata, to generate a personalized speech mimicking the voice quality of Elvis. In a similar manner, Denise's video/avatar and speech info also is sent to the Elvis' terminal.

Figure 19B:
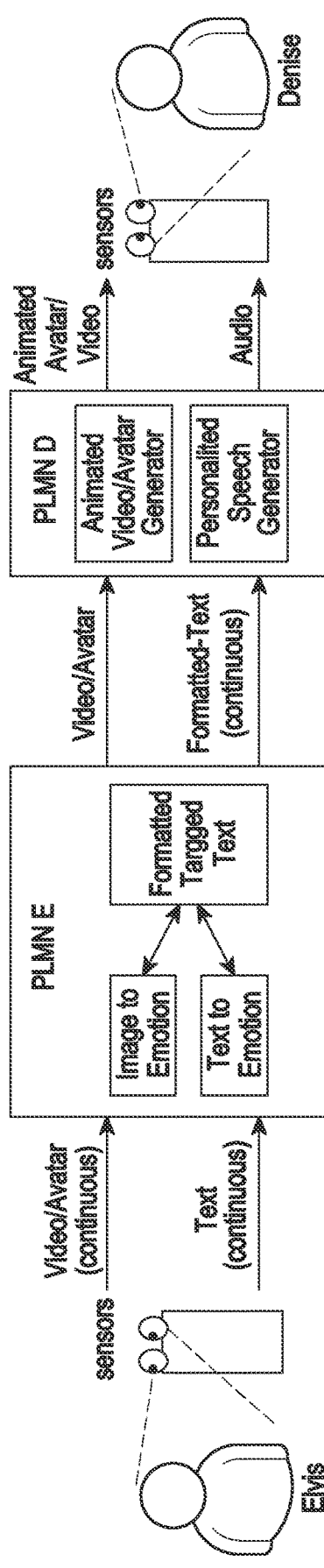
FIG. 19B depicts an example scenario, wherein an IMS 3D avatar call and audio is ongoing between two callers who want to maintain privacy according to an embodiment of the disclosure.

FIG. 19B depicts an example scenario, wherein an IMS 3D avatar call and audio is ongoing between two callers who want to maintain privacy according to an embodiment of the disclosure.

In this scenario, Elvis is in a crowded place where people nearby can listen to Elvis' terminal. The voices of nearby people can also be transmitted to Denise, which is also undesirable. Denise is in a quite private space. Elvis wants to make a call while keeping privacy secured, so he chooses to start a call, which is text based call on his end, while being an audio call at Denise's end. Elvis' terminal sends text messages typed by Elvis continuously. PLMN D performs text-to-speech transcoding using the formatted text sent to Denise. Denise sends audio stream throughout the call, which are used to generate text messages using speech recognition. Elvis' terminal displays the text message as received from PLMN D.

Embodiments herein disclose addition of new fields for audio and video channels along with the addition of IMS data channel for exchange of image, text and metadata information for RX side Intelligent convertor. The fields are as listed below:

1. SAT field: This field is marked as true if Satellite communication mechanism exists. A Satellite phone number is also provided if it is set to true, comma separated. If no SAT call support is there, this field is marked as false or omitted.

2. intelli_conv_aud field: This field is only for audio m-line. It indicates if audio processing and generation based on intelligent convertor is supported, set to 1 if supported. If not supported, set to 0, or omitted.

3. intelli_conv_vid field: This field is only for video m-line. Similar to "intelli_conv_aud".

4. link_dcmap field: This field is set only if "intelli_conv_vid" or "intelli_conv_aud" is set to 1. It indicates the data channel demap value where image or text data, as applicable, generated by other UE's Intelligent generator can be sent.

5. meta_dcmap field: This field is set only if "intelli_conv_vid" is set to 1. It indicates the data channel demap value where video reconstruction metadata generated by other UE's Intelligent generator can be sent.

An example SIP field structure is shown below:

```
INVITE
a=SAT:true,+919876543210
m=audio 10000 RTP/AVP 117
a=intelli_conv_aud:1
a=link_dcmap:11002
m=video 10002 RTP/AVP 118
a=intelli_conv_vid:1
a=link_dcmap:11000
A=meta_dcmap:11004
m=application 52718 UDP/DTLS/SCTP webrtc-datachannel
a=dcmap:11000 max-retr=5;label="low loss"
a=dcmap:11002 max-retr=5;label="low loss"
a=dcmap:11003 max-retr=5;label="low loss"
a=3gpp-qos-hint:loss=0.01
```

RTCP messages may be used when on operator call to send request from one UE to other UE to:

Request for a set of K images to be used for video reconstruction, and

Request for sending text messages instead of audio stream due to network and other ambient conditions.

Embodiments herein use RTCP SDES message in this example as it is exchanged periodically during call. According to the embodiments herein, alternative mechanisms, such as RTCP App, or Session Initiation Protocol/Session Description Protocol (SIP/SDP) based communication can also be done for exchanging images and other requests.

An example CName field on RTCP SDES field is given below.

CName: simsq_image_K_text@abcxyz.comis simsq is the actual CName of the device.

image_K refers to requesting K images from other UE to perform intelligent video reconstruction.

text refers to requesting other UE to send text message instead of audio stream

Only one or none of the above tags may be present in an RTCP message as per conditions and requirement.

Embodiments herein disclose a message format for including metadata. The text message format includes the speech converted to text format, the time information for reconverting each word appropriately, and the emotion of the user while speaking. Emotions may be from the set of emotions mentioned in Plutchik, R., "The Nature of Emotions", American Scientist, vol. 89, no. 4, p. 344, 2001. doi:10.1511/2001.4.344. Each type of information may be delimited by one or multiple characters, ## used in example below:

Hey! I wanted to go.

1500, 700, 1200, 500, 500.

surprise

The embodiments disclosed herein can be implemented through at least one software program running on at least one hardware device and performing network management functions to control the elements. The elements shown in FIG. 1 can be at least one of a hardware device, or a combination of hardware device and software module.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method for providing, by an electronic device, seamless connectivity in a call, the method comprising:

transmitting satellite communication capability information and converter capability information to one or more other electronic devices;

receiving the satellite communication capability information and the converter capability information from the one or more other electronic devices;

establishing the call with the one or more other electronic devices using a non-satellite communication network;

transferring the call from the non-satellite communication network to a satellite communication network using the satellite communication capability information and the converter capability information, based on determining that state of the non-satellite communication network is not sufficient for continuing the call;

transferring the call from the non-satellite communication network to a satellite communication network based on state of the non-satellite communication network changing from good or poor or weak to no network;

generating a single image, by a first converter communicatively coupled to the electronic device and converting audio content into time-tagged text messages with metadata; and transmitting a single image and time-tagged text messages with metadata over one of a data channel and web real-time communication (WebRTC), wherein the single image is generated by the first converter communicatively coupled to the electronic device and the time-tagged text messages with metadata is converted by the first converter from audio content, wherein video and audio are regenerated by a second converter at the one or more other electronic devices based on the received single image and the time-tagged text messages with metadata.

2. The method of claim 1, wherein the transmitting of the satellite communication capability information and the converter capability information is based on negotiation performed during an initiation of the call through the non-satellite communication network using a communication protocol.

3. The method of claim 1, wherein the state of the non-satellite communication network comprises one of good, poor, weak, and no network, and wherein the state of the non-satellite communication network is determined based on one or more of signal strength, network parameters, and ambient conditions at the electronic device.

4. The method of claim 1, further comprising:

transmitting, to the one or more other electronic devices, a signal indicating a change in the non-satellite communication network, based on the state of the non-satellite communication network changing from good or poor or no network to weak;

receiving, from the one or more other electronic devices, a request to transmit N number of images required for video reconstruction based on the second converter communicatively coupled to the one or more other electronic devices determining that pre-determined number of images sufficient for video reconstructions to recreate user expression and poses based on audio content are not available at the one or more other electronic devices, wherein the request for the N number of images is received using one of a real-time transport control protocol secure data encryption standard (RTCP SDES) message, RTCP App, and session Initiation protocol/session description protocol (SIP/SDP);

transmitting the N number of images and metadata-time tagged text messages corresponding to the audio content to the one or more other electronic devices, wherein the N number of images and the metadata-time tagged text messages are used by the one or more other electronic devices for regenerating video and audio based on the audio content from the electronic device; and based on the second converter determining that there are pre-determined number of images are available at the one or more other electronic devices, transmitting audio packets over an audio real-time transport protocol (RTP) port.

5. The method of claim 1, further comprising:

based on state of the non-satellite communication network changing from good or weak or no network to poor, receiving, from the one or more other electronic devices, a request to transmit M number of images required for video reconstruction and time-tagged text messages with metadata based on audio content, based on the second converter communicatively coupled to the one or more other electronic devices determining that pre-determined number of images for the video reconstruction to recreate user expression and poses based on the audio content are not available at the one or more other electronic devices, wherein the request for the M number of images is received using a real-time transport control protocol secure data encryption standard (RTCP SDES) message, wherein M is an integer lesser than N;

transmitting the M number of images and metadata-time tagged text messages to the one or more other electronic devices, wherein the received M number of images and the metadata-time tagged text messages are used by the one or more other electronic devices for regenerating video and audio; and based on the second converter determining that there are pre-determined number of images available at the one or more other electronic devices, transmitting the time-tagged text messages with metadata.

6. The method of claim 1, further comprising:
sending a SIP invite with audio content and video content and the satellite communication capability information to establish a session based on state of the non-satellite communication network changing from no network to good;
terminating satellite call and starting communication over the non-satellite communication network based on an acknowledgement by the one or more other electronic devices that the session is established; and
transmitting a plurality of video frames over a video RTP port and a plurality of audio packets over an audio RTP port.

7. The method of claim 1, further comprising:
upgrading audio call to a video call based on state of the non-satellite communication network changing from weak or poor to good.

8. The method of claim 1,
wherein the converter capability information comprises:
a field indicating capability of the one or more other electronic devices to regenerate audio using metadata-time tagged text messages and video using a plurality of video frames, wherein the metadata-time tagged text messages carry mic data, emotion, voice modulation, and pitch information necessary for producing accurate audio at the one or more other electronic devices, and
intelli_conv_aud, intelli_conv_vid, link_dcmap, and meta_dcmap fields,
wherein the satellite communication capability information comprises a SAT field,
wherein the SAT field is marked as true if satellite communication mechanism exists, wherein if the SAT field is true, a satellite phone number is provided separated by comma, and if there is no support for satellite communication mechanism, the SAT field is marked as false, and
wherein the intelli_conv_aud field is only for audio m-line and indicates if audio processing and generation based on converter is supported, wherein the intelli_conv_vid field indicates if video processing and generation based on the converter is supported, wherein the link_dcmap field indicates a data channel dcmap value where one of image and text data generated by the converter are sent, and wherein the meta_dcmap field indicates a data channel demap value where video reconstruction metadata generated by the converter are sent.

9. An electronic device for providing seamless connectivity in a call, the electronic device comprising:
memory storing instructions; and
a processor coupled to the memory,
wherein the instructions, when executed by the processor, cause the electronic device to:
transmit satellite communication capability information and converter capability information to one or more other electronic devices,
receive the satellite communication capability information and the converter capability information from the one or more other electronic devices,
establish a call with the one or more other electronic devices using a non-satellite communication network,
transfer the call from the non-satellite communication network to a satellite communication network using the satellite communication capability information and the converter capability information, based on determining that state of the non-satellite communication network is not sufficient for continuing the call,
transfer the call from the non-satellite communication network to a satellite communication network based on state of the non-satellite communication network changing from good or poor or weak to no network,
generate a single image, by a first converter communicatively coupled to the electronic device, and converting audio content into time-tagged text messages with metadata, and
transmit a single image and time-tagged text messages with metadata over one of a data channel and web real-time communication (WebRTC), wherein the single image is generated by the first converter communicatively coupled to the electronic device and the time-tagged text messages with metadata is converted by the first converter from audio content, and
wherein video and audio are regenerated by a second converter at the one or more other electronic devices based on the received single image and the time-tagged text messages with metadata.

10. The electronic device of claim 9,
wherein the state of the non-satellite communication network comprises one of good, poor, weak, and no network, and
wherein the state of the non-satellite communication network is determined based on one or more of signal strength, network parameters, and ambient conditions at the electronic device.

11. The electronic device of claim 9, wherein the processor is further configured to:
transmit, to the one or more other electronic devices, a signal indicating the change in the non-satellite communication network, based on the state of the non-satellite communication network changing from good or poor or no network to weak,
receive, from the one or more other electronic devices, a request to transmit N number of images required for video reconstruction based on the second converter communicatively coupled to the one or more other electronic devices determining that pre-determined number of images sufficient for video reconstructions to recreate user expression and poses based on audio content are not available at the one or more other electronic devices, wherein the request for the N number of images is received using one of a real-time transport control protocol secure data encryption standard (RTCP SDES) message, RTCP App, and session Initiation protocol/session description protocol (SIP/SDP),
transmit the N number of images and metadata-time tagged text messages corresponding to the audio content to the one or more other electronic devices, wherein the N number of images and the metadata-time tagged text messages are used by the one or more other electronic devices for regenerating video and audio based on the audio content from the electronic device; and
based on the second converter determining that there are pre-determined number of images are available at the one or more other electronic devices, transmit audio packets over an audio real-time transport protocol (RTP) port.

12. The electronic device of claim 9, wherein the processor is further configured to:

based on state of the non-satellite communication network changing from good or weak or no network to poor, receive, from the one or more other electronic devices, a request to transmit M number of images required for video reconstruction and time-tagged text messages with metadata based on audio content, based on the second converter communicatively coupled to the one or more other electronic devices determining that pre-determined number of images for the video reconstruction to recreate user expression and poses based on the audio content are not available at the one or more other electronic devices, wherein the request for the M number of images is received using a real-time transport control protocol secure data encryption standard (RTCP SDES) message, wherein M is an integer lesser than N, transmit the M number of images and metadata-time tagged text messages to the one or more other electronic devices, wherein the received M number of images and the metadata-time tagged text messages are used by the one or more other electronic devices for regenerating video and audio, and based on the second converter determining that there are pre-determined number of images available at the one or more other electronic devices, transmit the time-tagged text messages with metadata.

13. The electronic device of claim 9, wherein the processor is further configured to:

send a SIP invite with audio content and video content and the satellite communication capability information to establish a session based on state of the non-satellite communication network changing from no network to good, receive acknowledgment from the one or more other electronic devices that the session is established, terminate satellite call and start communication over the non-satellite communication network, and transmit a plurality of video frames over a video RTP port and a plurality of audio packets over an audio RTP port.

14. The electronic device of claim 9, wherein, the processor is further configured to upgrade audio call to a video call based on state of the non-satellite communication network changing from weak or poor to good.

15. The electronic device of claim 9, wherein the converter capability information at the one or more other electronic devices comprises:

a field indicating capability of the one or more other electronic devices to regenerate audio using metadata-time tagged text messages and video using a plurality of video frames, wherein the metadata-time tagged text messages carry mic data, emotion, voice modulation, and pitch information necessary for producing accurate audio at the one or more other electronic devices, and intelli_conv_aud, intelli_conv_vid, link_dcmap, and meta_dcmap fields, wherein the satellite communication capability information comprises a SAT field, wherein the SAT field is marked as true if satellite communication mechanism exists, wherein if the SAT field is true, a satellite phone number is provided separated by comma, and if there is no support for satellite communication mechanism, the SAT field is marked as false, and wherein the intelli_conv_aud field is only for audio m-line and indicates if audio processing and generation based on converter is supported, wherein the intelli_conv_vid field indicates if video processing and generation based on the converter is supported, wherein the link_dcmap field indicates a data channel dcmap value where one of image and text data generated by the converter are sent, and wherein the meta_dcmap field indicates a data channel dcmap value where video reconstruction metadata generated by the converter are sent.

16. The electronic device of claim 9, wherein, when the network conditions degrade, operator call settings on the first converter get saved and the operator call gets disconnected.

17. The electronic device of claim 9, wherein the processor is further configured to:

send additional metadata and timing information via text messages to the second converter from the first converter when the network conditions degrade.

18. A non-transitory computer readable storage medium storing instructions which, when executed by a processor of an electronic device, cause the electronic device to perform operations, the operations comprising:

transmitting satellite communication capability information and converter capability information to one or more other electronic devices;

receiving the satellite communication capability information and the converter capability information from the one or more other electronic devices;

establishing the call with the one or more other electronic devices using a non-satellite communication network;

transferring the call from the non-satellite communication network to a satellite communication network using the satellite communication capability information and the converter capability information, based on determining that state of the non-satellite communication network is not sufficient for continuing the call;

transferring the call from the non-satellite communication network to a satellite communication network based on state of the non-satellite communication network changing from good or poor or weak to no network;

generating a single image, by a first converter communicatively coupled to the electronic device and converting audio content into time-tagged text messages with metadata; and transmitting a single image and time-tagged text messages with metadata over one of a data channel and web real-time communication (WebRTC), wherein the single image is generated by the first converter communicatively coupled to the electronic device and the time-tagged text messages with metadata is converted by the first converter from audio content, wherein video and audio are regenerated by a second converter at the one or more other electronic devices based on the received single image and the time-tagged text messages with metadata.

* * * * *